(12) United States Patent
Hoon et al.

(10) Patent No.: US 11,484,041 B2
(45) Date of Patent: Nov. 1, 2022

(54) METHOD FOR CENTRIFUGAL EXTRACTION AND APPARATUS SUITABLE FOR CARRYING OUT THIS METHOD

(71) Applicant: COMETEER, INC., Bedford, MA (US)

(72) Inventors: Douglas Martin Hoon, Guilford, CT (US); Karl Winkler, Bedford, MA (US); Matthew P. Roberts, Ipswich, MA (US); Christopher H. Hendon, Eugene, OR (US)

(73) Assignee: COMETEER, INC., Gloucester, MA (US)

( * ) Notice: Subject to any disclaimer, the term of this patent is extended or adjusted under 35 U.S.C. 154(b) by 54 days.

(21) Appl. No.: 16/608,364

(22) PCT Filed: Apr. 27, 2018

(86) PCT No.: PCT/US2018/029735
§ 371 (c)(1),
(2) Date: Oct. 25, 2019

(87) PCT Pub. No.: WO2018/200922
PCT Pub. Date: Nov. 1, 2018

(65) Prior Publication Data
US 2021/0037847 A1 Feb. 11, 2021

Related U.S. Application Data

(60) Provisional application No. 62/585,403, filed on Nov. 13, 2017, provisional application No. 62/527,489, (Continued)

(51) Int. Cl.
*A23F 5/26* (2006.01)
*A47J 31/22* (2006.01)

(52) U.S. Cl.
CPC ............... *A23F 5/265* (2013.01); *A47J 31/22* (2013.01)

(58) Field of Classification Search
CPC .................................. A23F 5/265; A47J 31/22
See application file for complete search history.

(56) References Cited

U.S. PATENT DOCUMENTS

| 1,478,908 A | 12/1923 | Oldham |
| 1,505,592 A | 8/1924 | Epperson |

(Continued)

FOREIGN PATENT DOCUMENTS

| CA | 1157310 A | 11/1983 |
| CA | 2087242 A1 | 7/1993 |

(Continued)

OTHER PUBLICATIONS

"Clever Cocktail Presentation Trick: How to Make an Ice Wedge Glass (for Free!)", https://www.manmadediy.com/diy-whiskey-wedge-glass, Aug. 27, 2018 (13 pages).

(Continued)

*Primary Examiner* — Anthony J Weier
(74) *Attorney, Agent, or Firm* — Wilmer Cutler Pickering Hale and Dorr LLP

(57) ABSTRACT

A method and equipment for extracting dissolvable solids from small particles using a staged, counter-current battery of centrifuges is described. The advantages gained by working with particles having a mean diameter smaller than 50 microns and doing the extraction with the particles dispersed in a non-flowing liquid are (1) a significant reduction in the concentration gradient of the dissolvable solids across the diameter of the particles and throughout the body of particles being extracted in a comparable standard column battery and (2) higher overall yields because extraction can be conducted to a uniform limit rather than being con- (Continued)

strained by a local (surface or column position) limit. As regards coffee extraction, the equipment and method are intended for the production of high quality concentrated coffee extracts rather than the production of soluble or instant coffee.

27 Claims, 19 Drawing Sheets

Related U.S. Application Data filed on Jun. 30, 2017, provisional application No. 62/490,630, filed on Apr. 27, 2017.

(56) References Cited

U.S. PATENT DOCUMENTS

| | | | |
|---|---|---|---|
| 2,155,971 A | 4/1939 | Houseman | |
| 2,282,138 A * | 5/1942 | Kellogg | A23F 5/26 |
| | | | 426/432 |
| 2,312,046 A | 2/1943 | Warren | |
| 2,324,526 A | 7/1943 | Morgenthaler | |
| 2,332,553 A | 10/1943 | Benedict | |
| 2,432,759 A | 12/1947 | Heyman | |
| 2,515,794 A | 7/1950 | Palmer | |
| 2,559,032 A | 7/1951 | Tacchella | |
| 2,620,276 A | 12/1952 | Heyman | |
| 2,629,663 A | 2/1953 | Gogler et al. | |
| 2,863,776 A | 12/1958 | Lisher | |
| 2,887,038 A | 5/1959 | Axel | |
| 3,153,377 A | 10/1964 | Bosak | |
| 3,228,876 A | 1/1966 | Mahon | |
| 3,235,390 A | 2/1966 | Vischer | |
| 3,246,786 A | 4/1966 | Holley | |
| 3,261,507 A | 7/1966 | Cornelius | |
| 3,296,822 A | 1/1967 | Gram | |
| 3,349,691 A | 10/1967 | Austin et al. | |
| 3,385,201 A | 5/1968 | Martin | |
| 3,412,572 A | 11/1968 | Kesling | |
| 3,432,027 A | 3/1969 | Mueller | |
| 3,450,070 A | 6/1969 | Kaufman | |
| 3,458,320 A | 7/1969 | Niven | |
| 3,484,245 A | 12/1969 | Goto | |
| 3,582,351 A | 6/1971 | Austin et al. | |
| 3,589,272 A | 6/1971 | Bouladon et al. | |
| 3,607,280 A | 9/1971 | Durchholz | |
| 3,620,034 A * | 11/1971 | Ganiaris | B01D 9/04 |
| | | | 62/541 |
| 3,655,398 A | 4/1972 | Pitchon et al. | |
| 3,682,649 A | 8/1972 | Orozovich | |
| 3,700,466 A | 10/1972 | Bergeron et al. | |
| 3,762,177 A * | 10/1973 | Ganiaris | A23F 5/30 |
| | | | 62/123 |
| 3,762,930 A | 10/1973 | Mahlmann | |
| 3,769,033 A | 10/1973 | Panzer et al. | |
| 3,788,860 A | 1/1974 | Mahlmann | |
| 3,790,689 A | 2/1974 | Pitchon et al. | |
| 3,799,049 A | 3/1974 | Smith, Jr. | |
| 3,800,055 A | 3/1974 | Gallagher | |
| 3,830,940 A | 8/1974 | Sivetz | |
| 3,843,824 A | 10/1974 | Roselius et al. | |
| 3,908,033 A | 9/1975 | Ganiaris | |
| 3,914,956 A | 10/1975 | Knight, Jr. | |
| 3,920,226 A | 11/1975 | Walt | |
| 3,922,361 A | 11/1975 | Vann | |
| 3,995,067 A | 11/1976 | Marsh et al. | |
| 4,039,693 A | 8/1977 | Adams et al. | |
| 4,105,802 A | 8/1978 | Cho et al. | |
| 4,110,476 A | 8/1978 | Rhodes | |
| 4,136,202 A | 1/1979 | Favre | |
| 4,156,031 A | 5/1979 | Hamell et al. | |
| 4,158,329 A | 6/1979 | McKnight | |
| 4,189,991 A | 2/1980 | Haddad | |
| 4,226,891 A | 10/1980 | Lewis | |
| 4,276,315 A | 6/1981 | Katz et al. | |
| 4,277,509 A | 7/1981 | Wouda | |
| 4,285,490 A | 8/1981 | Hanley | |
| 4,310,468 A | 1/1982 | Reiners | |
| 4,352,829 A | 10/1982 | Noyes et al. | |
| 4,377,970 A | 3/1983 | Kenkel | |
| 4,414,113 A | 11/1983 | LaTerra | |
| 4,426,573 A | 1/1984 | Fudickar et al. | |
| 4,427,701 A | 1/1984 | Morley | |
| 4,505,191 A | 3/1985 | Longo | |
| 4,534,985 A | 8/1985 | Gasau | |
| 4,579,048 A | 4/1986 | Stover | |
| 4,633,771 A | 1/1987 | Anderl | |
| 4,641,572 A | 2/1987 | Varga | |
| 4,681,030 A | 7/1987 | Herbert | |
| 4,721,035 A | 1/1988 | Chang-Diaz | |
| 4,737,374 A | 4/1988 | Huber et al. | |
| 4,750,645 A | 6/1988 | Wilson et al. | |
| 4,784,678 A | 11/1988 | Rudick et al. | |
| 4,811,872 A | 3/1989 | Boyd | |
| 4,842,884 A | 6/1989 | Bookwalter et al. | |
| 4,844,918 A | 7/1989 | Hoashi | |
| 4,853,234 A | 8/1989 | Bentley et al. | |
| 4,882,982 A | 11/1989 | Muttoni | |
| 4,907,725 A | 3/1990 | Durham | |
| 4,929,462 A | 5/1990 | Moorman et al. | |
| 4,998,462 A | 3/1991 | Sekiguchi | |
| 5,041,245 A | 8/1991 | Benado | |
| 5,043,178 A | 8/1991 | Gottesman et al. | |
| 5,080,008 A | 1/1992 | Helbling | |
| 5,094,153 A | 3/1992 | Helbling | |
| 5,114,047 A | 5/1992 | Baron et al. | |
| 5,114,728 A | 5/1992 | Ben-Nasr et al. | |
| 5,114,731 A | 5/1992 | Belville et al. | |
| 5,115,730 A | 5/1992 | Gockelmann | |
| 5,127,318 A | 7/1992 | Selby, III | |
| 5,151,287 A | 9/1992 | Schlecht et al. | |
| 5,168,794 A | 12/1992 | Glucksman | |
| 5,204,136 A | 4/1993 | Hellemons | |
| 5,216,327 A | 6/1993 | Myers et al. | |
| 5,230,278 A | 7/1993 | Bunn et al. | |
| 5,242,700 A | 9/1993 | Schlecht | |
| 5,255,593 A | 10/1993 | Bunn et al. | |
| 5,267,506 A | 12/1993 | Cai | |
| 5,284,028 A | 2/1994 | Stuhmer | |
| 5,297,472 A | 3/1994 | Suzuki et al. | |
| 5,301,694 A | 4/1994 | Raymond et al. | |
| 5,303,639 A | 4/1994 | Bunn et al. | |
| 5,323,691 A | 6/1994 | Reese et al. | |
| 5,325,765 A | 7/1994 | Sylvan et al. | |
| 5,335,589 A | 8/1994 | Yerves, Jr. et al. | |
| 5,337,652 A | 8/1994 | Fischer et al. | |
| 5,343,799 A | 9/1994 | Fond | |
| 5,347,916 A | 9/1994 | Fond et al. | |
| 5,353,692 A | 10/1994 | Reese et al. | |
| 5,363,745 A | 11/1994 | Lin | |
| 5,372,832 A | 12/1994 | Bunn et al. | |
| 5,392,694 A | 2/1995 | Muller et al. | |
| 5,393,540 A | 2/1995 | Bunn et al. | |
| 5,398,596 A | 3/1995 | Fond | |
| 5,427,806 A | 6/1995 | Ekanayake et al. | |
| 5,473,973 A | 12/1995 | Cortese | |
| 5,480,189 A | 1/1996 | Davies et al. | |
| 5,497,792 A | 3/1996 | Prasad et al. | |
| 5,507,415 A | 4/1996 | Sizemore | |
| 5,525,746 A | 6/1996 | Franke | |
| 5,637,343 A | 6/1997 | Ryan, Jr. | |
| 5,638,740 A | 6/1997 | Cai | |
| 5,651,482 A | 7/1997 | Sizemore | |
| 5,656,316 A | 8/1997 | Fond et al. | |
| 5,669,208 A | 9/1997 | Tabaroni et al. | |
| 5,699,719 A | 12/1997 | Lucas et al. | |
| 5,704,950 A | 1/1998 | Putatunda | |
| 5,707,673 A | 1/1998 | Prevost et al. | |
| 5,724,883 A | 3/1998 | Usherovich | |
| 5,739,364 A | 4/1998 | Franke | |
| 5,770,003 A | 6/1998 | Tabaroni et al. | |
| D395,821 S | 7/1998 | Tabaroni et al. | |
| 5,778,765 A | 7/1998 | Klawuhn et al. | |

(56) References Cited

U.S. PATENT DOCUMENTS

| | | |
|---|---|---|
| D397,292 S | 8/1998 | Tabaroni et al. |
| 5,789,005 A | 8/1998 | Tabaroni et al. |
| 5,799,501 A | 9/1998 | Leonard et al. |
| 5,847,127 A | 12/1998 | D'Alessio et al. |
| 5,853,785 A | 12/1998 | Nayyar et al. |
| 5,868,062 A | 2/1999 | Enomoto |
| 5,897,899 A | 4/1999 | Fond |
| 5,901,636 A | 5/1999 | Witziers et al. |
| 5,927,085 A | 7/1999 | Waldman |
| 5,958,481 A | 9/1999 | Hodges |
| 5,997,936 A | 12/1999 | Jimenez-Laguna |
| 6,026,732 A | 2/2000 | Kollep et al. |
| 6,041,697 A | 3/2000 | Maoz |
| 6,079,315 A | 6/2000 | Beaulieu et al. |
| 6,082,247 A | 7/2000 | Beaulieu |
| 6,102,213 A | 8/2000 | Gurol |
| 6,112,537 A | 9/2000 | Broadbent |
| 6,142,063 A | 11/2000 | Beaulieu et al. |
| 6,180,149 B1 | 1/2001 | Gramm |
| 6,182,554 B1 | 2/2001 | Beaulieu et al. |
| 6,203,837 B1 | 3/2001 | Kalenian |
| 6,224,683 B1 | 5/2001 | Tanikawa et al. |
| 6,277,426 B1 | 8/2001 | Reust |
| 6,286,415 B1 | 9/2001 | Leung |
| 6,311,500 B1 | 11/2001 | Fraenkel |
| 6,339,985 B1 | 1/2002 | Whitney |
| 6,407,224 B1 | 6/2002 | Mironov et al. |
| 6,440,256 B1 | 8/2002 | Gordon et al. |
| 6,444,160 B1 | 9/2002 | Bartoli |
| 6,511,963 B1 | 1/2003 | Maccecchini |
| 6,514,552 B1 | 2/2003 | Sivetz |
| 6,534,108 B2 | 3/2003 | Jimenez-Laguna et al. |
| 6,548,094 B2 | 4/2003 | Kalenian |
| 6,551,646 B1 | 4/2003 | Baker |
| 6,589,577 B2 | 7/2003 | Lazaris et al. |
| 6,602,538 B1 | 8/2003 | Watkins, Jr. et al. |
| 6,602,879 B2 | 8/2003 | Murthy et al. |
| 6,606,938 B2 | 8/2003 | Taylor |
| 6,607,762 B2 | 8/2003 | Lazaris et al. |
| 6,609,821 B2 | 8/2003 | Wulf et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 6,727,484 B2 | 4/2004 | Policappelli |
| 6,740,345 B2 | 5/2004 | Cai |
| 6,887,506 B2 | 5/2005 | Kalenian |
| 6,948,420 B2 | 9/2005 | Kirschner et al. |
| 7,004,322 B1 | 2/2006 | Bartoli |
| 7,165,488 B2 | 1/2007 | Bragg et al. |
| 7,168,560 B2 | 1/2007 | Finetti et al. |
| 7,192,629 B2 | 3/2007 | Lammertink et al. |
| 7,258,061 B2 | 8/2007 | Campbell et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,419,692 B1 | 9/2008 | Kalenian |
| 7,464,636 B2 | 12/2008 | Mariller |
| 7,473,869 B2 | 1/2009 | Chun |
| 7,493,930 B2 | 2/2009 | Finetti et al. |
| 7,513,192 B2 | 4/2009 | Sullivan et al. |
| 7,523,695 B2 | 4/2009 | Streeter et al. |
| 7,591,217 B2 | 9/2009 | Kodden et al. |
| 7,640,845 B2 | 1/2010 | Woodnorth et al. |
| 7,726,233 B2 | 6/2010 | Kodden et al. |
| 7,820,948 B1 | 10/2010 | Renau |
| 7,875,304 B2 | 1/2011 | Kalenian |
| 7,959,851 B2 | 6/2011 | Finetti et al. |
| 7,959,967 B2 | 6/2011 | Pattenden |
| 8,087,347 B2 | 1/2012 | Halliday et al. |
| 8,151,694 B2 | 4/2012 | Jacobs et al. |
| 8,361,527 B2 | 1/2013 | Winkler et al. |
| 8,475,153 B2 | 7/2013 | Finetti et al. |
| 8,495,949 B2 | 7/2013 | Tinkler et al. |
| 8,516,948 B2 | 8/2013 | Zimmerman et al. |
| 8,524,306 B2 | 9/2013 | Robinson et al. |
| 8,534,501 B2 | 9/2013 | Nevarez et al. |
| 8,535,748 B2 | 9/2013 | Robinson et al. |
| 8,541,042 B2 | 9/2013 | Robinson et al. |
| 8,563,058 B2 | 10/2013 | Roulin et al. |
| 8,573,114 B2 | 11/2013 | Huang et al. |
| 8,609,170 B2 | 12/2013 | Tinkler et al. |
| 8,628,811 B2 | 1/2014 | Panyam et al. |
| 8,663,080 B2 | 3/2014 | Bartoli et al. |
| 8,667,892 B2 | 3/2014 | Cominelli et al. |
| 8,685,479 B2 | 4/2014 | Dogan et al. |
| 8,709,519 B1 | 4/2014 | dePoo |
| 8,722,124 B2 | 5/2014 | Ozanne |
| 8,752,478 B2 | 6/2014 | Nocera |
| 8,758,844 B2 | 6/2014 | Nocera |
| 8,800,431 B2 | 8/2014 | Sullivan et al. |
| 8,808,775 B2 | 8/2014 | Novak et al. |
| 8,826,811 B2 | 9/2014 | Kim |
| 8,834,948 B2 | 9/2014 | Estabrook et al. |
| 8,863,987 B2 | 10/2014 | Jacobs et al. |
| 8,877,276 B2 | 11/2014 | Cominelli et al. |
| 8,889,203 B2 | 11/2014 | York |
| 8,916,215 B2 | 12/2014 | Yoakim et al. |
| 8,920,858 B2 | 12/2014 | Yauk et al. |
| 8,956,672 B2 | 2/2015 | Yoakim et al. |
| 8,960,078 B2 | 2/2015 | Hristov et al. |
| 8,962,048 B2 | 2/2015 | Gerbaulet et al. |
| 8,973,341 B2 | 3/2015 | Bartoli et al. |
| 9,016,196 B2 | 4/2015 | Hensel |
| 9,023,412 B2 | 5/2015 | Doleac et al. |
| 9,079,705 B2 | 7/2015 | Digiuni |
| 9,085,410 B2 | 7/2015 | Beer |
| 9,107,444 B2 | 8/2015 | Lynn et al. |
| 9,113,744 B2 | 8/2015 | Digiuni |
| 9,120,617 B2 | 9/2015 | Beer |
| 9,161,652 B2 | 10/2015 | Kamerbeek et al. |
| D742,679 S | 11/2015 | Bartoli et al. |
| 9,192,189 B1 | 11/2015 | McDermott et al. |
| 9,205,975 B2 | 12/2015 | Giovanni |
| 9,232,871 B2 | 1/2016 | Rivera |
| 9,247,430 B2 | 1/2016 | Kountouris et al. |
| 9,259,114 B2 | 2/2016 | Nevarez et al. |
| 9,277,758 B2 | 3/2016 | Zeller et al. |
| 9,346,611 B1 | 5/2016 | Roberts et al. |
| 9,408,492 B1 | 8/2016 | Roberts et al. |
| 9,408,493 B1 | 8/2016 | Roberts et al. |
| 9,468,230 B2 | 10/2016 | Roberts et al. |
| 9,516,970 B2 | 12/2016 | Roberts et al. |
| 9,538,877 B2 | 1/2017 | Roberts et al. |
| 9,615,597 B2 | 4/2017 | Roberts et al. |
| 9,630,770 B2 | 4/2017 | Roberts et al. |
| 9,675,203 B2 | 6/2017 | Roberts et al. |
| 10,111,554 B2 | 10/2018 | Roberts et al. |
| 10,264,912 B2 | 4/2019 | Roberts et al. |
| 11,096,518 B2 | 8/2021 | Roberts et al. |
| 2001/0002269 A1 | 5/2001 | Zhao |
| 2001/0006695 A1 | 7/2001 | Jimenez-Laguna et al. |
| 2001/0043954 A1 | 11/2001 | Sweet |
| 2001/0052294 A1 | 12/2001 | Schmed |
| 2002/0048621 A1 | 4/2002 | Boyd et al. |
| 2002/0148356 A1 | 10/2002 | Lazaris et al. |
| 2003/0006185 A1 | 1/2003 | Hepler |
| 2003/0118707 A1 | 6/2003 | Kalenian |
| 2003/0172813 A1 | 9/2003 | Schifferle |
| 2003/0222089 A1 | 12/2003 | Hale |
| 2004/0045265 A1 | 3/2004 | Bartoli et al. |
| 2004/0075069 A1 | 4/2004 | Bartoli et al. |
| 2004/0077475 A1 | 4/2004 | Bartoli |
| 2004/0118290 A1 | 6/2004 | Cai |
| 2004/0144800 A1 | 7/2004 | Danby et al. |
| 2004/0232595 A1 | 11/2004 | Bartoli |
| 2004/0247721 A1 | 12/2004 | Finetti et al. |
| 2004/0250686 A1 | 12/2004 | Hale |
| 2004/0256766 A1 | 12/2004 | Finetti et al. |
| 2005/0008754 A1 | 1/2005 | Sweeney et al. |
| 2005/0017118 A1 | 1/2005 | Finetti et al. |

(56) References Cited

U.S. PATENT DOCUMENTS

| | | |
|---|---|---|
| 2005/0034580 A1 | 2/2005 | Finetti et al. |
| 2005/0034817 A1 | 2/2005 | Finetti et al. |
| 2005/0039849 A1 | 2/2005 | Finetti et al. |
| 2005/0051033 A1 | 3/2005 | Lassota |
| 2005/0112253 A1 | 5/2005 | Kalenian |
| 2005/0130820 A1 | 6/2005 | Finetti et al. |
| 2005/0138902 A1 | 6/2005 | Bartoli et al. |
| 2005/0160918 A1 | 7/2005 | Winstanley et al. |
| 2005/0160919 A1 | 7/2005 | Balkau |
| 2005/0163892 A1 | 7/2005 | Breslow et al. |
| 2005/0247205 A1 | 11/2005 | Chen et al. |
| 2005/0266122 A1 | 12/2005 | Franceschi et al. |
| 2006/0000363 A1 | 1/2006 | Streeter et al. |
| 2006/0019000 A1 | 1/2006 | Zanetti |
| 2006/0083835 A1 | 4/2006 | Raghavan et al. |
| 2006/0107841 A1 | 5/2006 | Schifferle |
| 2006/0115573 A1 | 6/2006 | Singer et al. |
| 2006/0127555 A1 | 6/2006 | Breslow et al. |
| 2006/0174769 A1 | 8/2006 | Favre et al. |
| 2006/0196363 A1 | 9/2006 | Rahn |
| 2006/0219098 A1 | 10/2006 | Mandralis et al. |
| 2006/0243838 A1 | 11/2006 | Nakato |
| 2006/0255066 A1 | 11/2006 | Kannar et al. |
| 2006/0516398 | 11/2006 | Kannar et al. |
| 2006/0273013 A1 | 12/2006 | Chin et al. |
| 2007/0077343 A1 | 4/2007 | Ma et al. |
| 2007/0175334 A1 | 8/2007 | Halliday et al. |
| 2007/0202237 A1 | 8/2007 | Yoakim et al. |
| 2007/0210105 A1 | 9/2007 | Malachowsky et al. |
| 2007/0251260 A1 | 11/2007 | Baxter et al. |
| 2007/0251397 A1 | 11/2007 | Dorsten et al. |
| 2008/0038441 A1 | 2/2008 | Kirschner |
| 2008/0041236 A1 | 2/2008 | Raouf et al. |
| 2008/0089983 A1 | 4/2008 | Coste |
| 2008/0233264 A1 | 9/2008 | Doglioni Majer et al. |
| 2009/0061219 A1 | 3/2009 | Spynda et al. |
| 2009/0092724 A1 | 4/2009 | Mattie |
| 2009/0109793 A1 | 4/2009 | Xue |
| 2009/0126577 A1 | 5/2009 | Ternite |
| 2009/0127297 A1 | 5/2009 | Zirps |
| 2009/0214713 A1 | 8/2009 | Banim et al. |
| 2009/0223375 A1 | 9/2009 | Verbeek |
| 2009/0235827 A1 | 9/2009 | Bongers et al. |
| 2009/0235828 A1 | 9/2009 | Kerstens |
| 2009/0266239 A1 | 10/2009 | Noordhuis |
| 2010/0015313 A1 | 1/2010 | Harris |
| 2010/0018405 A1 | 1/2010 | Duvall |
| 2010/0034929 A1 | 2/2010 | Dogan et al. |
| 2010/0083843 A1 | 4/2010 | Denisart et al. |
| 2010/0098812 A1 | 4/2010 | Le et al. |
| 2010/0104695 A1 | 4/2010 | Faella et al. |
| 2010/0107889 A1 | 5/2010 | Denisart et al. |
| 2010/0143565 A1 | 6/2010 | McGill |
| 2010/0209563 A1 | 8/2010 | Mark |
| 2010/0215808 A1 | 8/2010 | Versini |
| 2010/0239734 A1 | 9/2010 | Yoakim et al. |
| 2010/0266740 A1 | 10/2010 | Van Den Aker et al. |
| 2010/0282088 A1 | 11/2010 | Deuber et al. |
| 2010/0287951 A1 | 11/2010 | Lynn et al. |
| 2010/0288131 A1 | 11/2010 | Kilber et al. |
| 2010/0303964 A1 | 12/2010 | Beaulieu et al. |
| 2011/0024409 A1 | 2/2011 | Shah et al. |
| 2011/0041701 A1 | 2/2011 | Chatterjee et al. |
| 2011/0045144 A1 | 2/2011 | Boussemart et al. |
| 2011/0070348 A1 | 3/2011 | Burton-Wilcock et al. |
| 2011/0071009 A1 | 3/2011 | Bartoli et al. |
| 2011/0076361 A1 | 3/2011 | Peterson et al. |
| 2011/0094195 A1 | 4/2011 | Bartoli et al. |
| 2011/0117259 A1 | 5/2011 | Storek et al. |
| 2011/0183043 A1 | 7/2011 | Reati |
| 2011/0200726 A1 | 8/2011 | Tinkler et al. |
| 2011/0203740 A1 | 8/2011 | Finetti et al. |
| 2011/0226343 A1 | 9/2011 | Novak et al. |
| 2011/0244099 A1 | 10/2011 | Perentes et al. |
| 2011/0274802 A1 | 11/2011 | Rivera |
| 2011/0293805 A1 | 12/2011 | Perentes et al. |
| 2011/0300276 A1 | 12/2011 | Ozanne |
| 2012/0030869 A1 | 2/2012 | Del Saz Salazar |
| 2012/0063753 A1 | 3/2012 | Cochran et al. |
| 2012/0070542 A1 | 3/2012 | Camera et al. |
| 2012/0100275 A1 | 4/2012 | Bishop et al. |
| 2012/0121779 A1 | 5/2012 | Lai et al. |
| 2012/0207895 A1 | 8/2012 | Rivera |
| 2012/0207896 A1 | 8/2012 | Rivera |
| 2012/0267036 A1 | 10/2012 | Bartoli et al. |
| 2012/0276264 A1 | 11/2012 | Rivera |
| 2012/0291634 A1 | 11/2012 | Startz |
| 2012/0308688 A1 | 12/2012 | Peterson et al. |
| 2012/0308691 A1 | 12/2012 | Alvarez et al. |
| 2013/0043151 A1 | 2/2013 | Bartoli et al. |
| 2013/0055902 A1 | 3/2013 | Berto et al. |
| 2013/0077148 A1 | 3/2013 | Ribi |
| 2013/0098249 A1 | 4/2013 | Fidler et al. |
| 2013/0101716 A1 | 4/2013 | Beaulieu et al. |
| 2013/0118360 A1 | 5/2013 | Dogan et al. |
| 2013/0139699 A1 | 6/2013 | Rivera |
| 2013/0156897 A1 | 6/2013 | Goldstein |
| 2013/0180406 A1 | 7/2013 | Hay et al. |
| 2013/0193616 A1 | 8/2013 | Bartoli et al. |
| 2013/0199378 A1 | 8/2013 | Yoakim et al. |
| 2013/0202748 A1 | 8/2013 | Fountain et al. |
| 2013/0202761 A1 | 8/2013 | McKee |
| 2013/0209627 A1 | 8/2013 | MacPherson |
| 2013/0232992 A1 | 9/2013 | Bisceglie |
| 2013/0239817 A1 | 9/2013 | Starr et al. |
| 2013/0243929 A1 | 9/2013 | Matsui |
| 2013/0327223 A1 | 12/2013 | Bartoli et al. |
| 2014/0007776 A1 | 1/2014 | Mori et al. |
| 2014/0026761 A1 | 1/2014 | Bartoli et al. |
| 2014/0057033 A1 | 2/2014 | Lai et al. |
| 2014/0076167 A1 | 3/2014 | Boggavarapu |
| 2014/0106033 A1 | 4/2014 | Roberts |
| 2014/0134299 A1 | 5/2014 | Guidorzi et al. |
| 2014/0137210 A1 | 5/2014 | Kountouris et al. |
| 2014/0154387 A1 | 6/2014 | Almblad et al. |
| 2014/0199442 A1 | 7/2014 | Orsi |
| 2014/0216276 A1 | 8/2014 | Soderman |
| 2014/0272077 A1 | 9/2014 | Robinson et al. |
| 2014/0287105 A1 | 9/2014 | Husband et al. |
| 2014/0295030 A1 | 10/2014 | Downes et al. |
| 2014/0331987 A1 | 11/2014 | Ford et al. |
| 2014/0342060 A1 | 11/2014 | Bartoli et al. |
| 2014/0352543 A1 | 12/2014 | Boni et al. |
| 2015/0001100 A1 | 1/2015 | Bartoli et al. |
| 2015/0024179 A1 | 1/2015 | Huang |
| 2015/0047509 A1 | 2/2015 | Trombetta et al. |
| 2015/0068405 A1 | 3/2015 | Bartoli et al. |
| 2015/0072052 A1 | 3/2015 | Bartoli et al. |
| 2015/0107275 A1 | 4/2015 | Papalia |
| 2015/0108011 A1 | 4/2015 | Bartoli et al. |
| 2015/0128525 A1 | 5/2015 | Bartoli et al. |
| 2015/0140251 A1 | 5/2015 | Bartoli et al. |
| 2015/0151903 A1 | 6/2015 | Bartoli et al. |
| 2015/0201790 A1 | 7/2015 | Smith et al. |
| 2015/0201796 A1 | 7/2015 | Kuempel et al. |
| 2015/0210030 A1 | 7/2015 | Bartoli et al. |
| 2015/0217880 A1 | 8/2015 | Bartoli et al. |
| 2015/0217881 A1 | 8/2015 | Bartoli et al. |
| 2015/0232279 A1 | 8/2015 | Bartoli et al. |
| 2015/0257588 A1 | 9/2015 | Stein et al. |
| 2015/0327717 A1 | 11/2015 | Burrows |
| 2015/0329282 A1 | 11/2015 | Bartoli et al. |
| 2015/0344219 A1 | 12/2015 | Bartoli et al. |
| 2015/0367269 A1 | 12/2015 | Bartoli et al. |
| 2016/0000135 A1 | 1/2016 | Evans et al. |
| 2016/0001903 A1 | 1/2016 | Bartoli et al. |
| 2016/0023226 A1 | 1/2016 | Wickert et al. |
| 2016/0051079 A1 | 2/2016 | Abegglen et al. |
| 2016/0183544 A1 | 6/2016 | Fitch et al. |
| 2017/0014836 A1* | 1/2017 | Fisher .................... B04B 15/06 |
| 2017/0055557 A1 | 3/2017 | Roberts et al. |
| 2020/0085231 A1 | 3/2020 | Roberts et al. |

(56) References Cited

U.S. PATENT DOCUMENTS

| | | | |
|---|---|---|---|
| 2020/0146308 A1 | 5/2020 | Roberts et al. | |
| 2020/0178553 A1 | 6/2020 | Roberts et al. | |
| 2021/0037847 A1 | 2/2021 | Hoon et al. | |

FOREIGN PATENT DOCUMENTS

| | | |
|---|---|---|
| CA | 2789993 A1 | 10/2004 |
| CA | 2902391 A1 | 9/2014 |
| CN | 1071810 A | 5/1993 |
| CN | 1615780 A | 5/2005 |
| CN | 101035719 A | 9/2007 |
| CN | 201005504 Y | 1/2008 |
| CN | 101322523 A | 12/2008 |
| CN | 101720842 A | 6/2010 |
| CN | 102144703 A | 8/2011 |
| CN | 201957705 U | 9/2011 |
| CN | 201987311 U | 9/2011 |
| CN | 102326810 A | 1/2012 |
| CN | 202197798 U | 4/2012 |
| CN | 102574638 A | 7/2012 |
| CN | 102816875 A | 12/2012 |
| CN | 103180225 A | 6/2013 |
| CN | 103380066 A | 10/2013 |
| CN | 103815788 A | 5/2014 |
| CN | 104968218 A | 10/2015 |
| DE | 3318317 A1 | 11/1984 |
| DE | 19706005 A1 | 8/1998 |
| EP | 0256567 A2 | 2/1988 |
| EP | 0412496 A2 | 2/1991 |
| EP | 0812558 A1 | 12/1997 |
| EP | 0893065 A2 | 1/1999 |
| EP | 0916266 A1 | 5/1999 |
| EP | 0941668 A1 | 9/1999 |
| EP | 1440910 A1 | 7/2004 |
| EP | 1488838 A1 | 12/2004 |
| EP | 1787523 A2 | 5/2007 |
| EP | 2468159 A1 | 6/2012 |
| EP | 2384133 B1 | 3/2013 |
| EP | 3629758 | 4/2020 |
| EP | 3503770 | 4/2021 |
| EP | 3868261 | 8/2021 |
| GB | 691845 A | 5/1953 |
| GB | 1169586 A | 11/1969 |
| GB | 2410998 A | 8/2005 |
| JP | H01194915 A | 8/1989 |
| JP | 02-031663 | 2/1990 |
| JP | 02138938 | 5/1990 |
| JP | H02119748 A | 5/1990 |
| JP | 4045747 | 2/1992 |
| JP | H04088948 | 3/1992 |
| JP | H11-221061 A | 8/1999 |
| JP | 2008081208 A | 4/2008 |
| JP | 2008-521399 A | 6/2008 |
| JP | 2010220642 A | 10/2010 |
| JP | 2012510267 A | 5/2012 |
| JP | 5101941 B2 | 12/2012 |
| JP | 2013-502925 A | 1/2013 |
| JP | 2013-537095 A | 9/2013 |
| JP | 2014-030768 A | 2/2014 |
| JP | 2014-505564 A | 3/2014 |
| JP | 2014520552 A | 8/2014 |
| JP | 2020-517400 A | 6/2020 |
| JP | 6791941 B2 | 11/2020 |
| KR | 101075465 B1 | 10/2011 |
| NL | 6803767 A | 5/1968 |
| WO | WO-1993/09684 A1 | 5/1993 |
| WO | WO-199710720 A1 | 3/1997 |
| WO | WO-0019833 A2 | 4/2000 |
| WO | WO-0032058 A1 | 6/2000 |
| WO | WO-00/56163 A1 | 9/2000 |
| WO | WO-0130173 A2 | 5/2001 |
| WO | WO-2002059035 A2 | 8/2002 |
| WO | WO-2002/098759 | 12/2002 |
| WO | WO-2004067386 | 8/2004 |
| WO | WO-2004/091305 A1 | 10/2004 |
| WO | WO-2005/092160 A1 | 10/2005 |
| WO | WO-2006/017893 A1 | 2/2006 |
| WO | WO-2006/077259 A1 | 7/2006 |
| WO | WO-2006121353 A1 | 11/2006 |
| WO | WO-2008148604 | 12/2008 |
| WO | WO-2010014201 | 2/2010 |
| WO | WO-2010/066736 A1 | 6/2010 |
| WO | WO-2011084603 | 7/2011 |
| WO | WO-2011094677 | 8/2011 |
| WO | WO-2012/121779 A1 | 9/2012 |
| WO | WO-2012/174331 A1 | 12/2012 |
| WO | WO-2013039591 | 3/2013 |
| WO | WO-2013/124811 A1 | 8/2013 |
| WO | WO-2014/053614 A1 | 4/2014 |
| WO | WO-2014057094 | 4/2014 |
| WO | WO-2014060724 | 4/2014 |
| WO | WO-2014147256 | 9/2014 |
| WO | WO-2014206799 | 12/2014 |
| WO | WO-2015/049049 A2 | 4/2015 |
| WO | WO-2015075535 A1 | 5/2015 |
| WO | WO-2016096611 | 6/2016 |
| WO | WO-2016154037 A1 | 9/2016 |
| WO | WO-2018039675 | 3/2018 |
| WO | WO-2018200922 | 11/2018 |
| WO | WO-2018222677 | 12/2018 |
| WO | WO-2018222677 A1 | 12/2018 |

OTHER PUBLICATIONS

"How Come: Cold hard fact: Surface area matters", https://www.newsday.com/news/health/how-come-cold-hard-fact-surface-area-matters-1.1866438, updated Apr. 23, 2010, accessed Feb. 23, 2021 (3 pages).

40° Below Joe—Beaded Coffee, https://40belowjoe.com, accessed May 20, 2020 (7 pages).

Chemwiki, "Overview of Alcohol," http://chemwiki.ucdavis.edu/Organic_Chemistry/Alcohols/Properties_of_Alcohols/Overview_of_Alcohol, accessed Sep. 7, 2015, (3 pages).

Colonna and Smalls, "Catch Up", https://colonnaandsmalls.wordpress.com/2015/10/, Oct. 11, 2015 (5 pages).

Corrochano, et al., "A new methodology to estimate the steady-state permeability of roast and ground coffee in packed beds", Journal of Food Engineering, 150:106-116, 2015, available online Nov. 22, 2014 (11 pages).

European Extended Search Report issued in European Application No. EP21167377.7, dated Jul. 12, 2021 (8 pages).

Helmenstine, "What is the Freezing Point of Alcohol?—Freezing Temperature of Alcohol" http://chemistry.about.com/od/factsstructures/fl/What-is-the-Freezing-Point-of-Alcohol-Freezing-Temperature-of-Alcohol.htm, 2015 (4 pages).

Helmenstine, "What is the Freezing Point of Water," http://chemistry.about.com/od/waterchemistry/f/freezing-point-of-water.htm, 2015, (3 pages).

Helmenstine, "What is the Melting Point of Water?", http://chemistry.about.com/od/waterchemistry/f/What-Is-The-Melting-Point-Of-Water.htm, 2015, (3 pages).

Hendon, et al., "The Grinder Paper: Explained", https://baristahustle.com/blogs/barista-hustle/the-grinder-paper-explained, Jan. 30, 2017 (9 pages).

International Search Report and Written Opinion as issued by the European Patent Office as International Searching Authority issued in International Application No. PCT/US18/29735, dated Sep. 17, 2018 (19 pages).

International Search Report and Written Opinion issued by the U.S. Patent and Trademark Office as International Searching Authority for International Application No. PCT/US16/40116 dated Oct. 4, 2016 (16 pages).

International Search Report and Written Opinion issued by the European Patent Office as International Searching Authority for International Application No. PCT/US2017/027149 dated Sep. 20, 2017 (29 pages).

International Search Report and Written Opinion issued by European Patent Office as International Searching Authority in International Application No. PCT/US18/35073, dated Oct. 9, 2018 (18 pages).

(56) References Cited

OTHER PUBLICATIONS

International Search Report and Written Opinion issued by the European Patent Office as International Searching Authority for International Application No. PCT/US2016/023226 dated Jun. 27, 2016 (10 pages).

International Search Report and Written Opinion issued by the European Patent Office for International Application No. PCT/US2017/048932 dated Nov. 14, 2017 (13 pages).

International Search Report and Written Opinion issued by the Korean Intellectual Property Office for PCT/US13/64634, dated Mar. 21, 2014 (8 pages).

International Search Report issued by the European Patent Office for International Application No. PCT/US00/29651 dated Jun. 19, 2001 (6 pgs.).

Karpuschewski, B, et al., "Ice Blasting—An Innovative Concept for the Problem-Oriented Deburring of Workpieces", Burrs—Analysis, Control and Removal, Springer-Verlag Berlin Heidelberg; pp. 197-201, 2010 (5 pages).

Perlmutter, "Solid-liquid filtration basics", Processing Magazine, http://www.processingmagazine.com/solid-liquid-filtration-basics/, Feb. 5, 2016 (13 pages).

Sahin, et al., "Chapter 1: Size, Shape, Volume and Related Physical Attributes", in Physical Properties of Foods, Heldman Ed., Springer Science + Business Media, LLC, pp. 1-37, 2006 (50 pages).

Sheu, M.J. and Wiley, R.C., "Preconcentration of Apple Juice by Reverse Osmosis", Journal of Food Science, vol. 48, No. 2, pp. 422-429, 1983 (8 pages).

Spiro, M. and Selwood, R.M., "The Kinetics and Mechanism of Caffeine Infusion from Coffee: The Effect of Particle Size", J. Sci. Food Agric., 35:915-924, 1984 (10 pages).

Stewart, "Keep-Cool Cubes," http://www.marthastewart.com/356419/flavored-ice-cube-ideas, 9 pages (Jul. 2012).

The Kitchn, "Why You Can Store Vodka But Not Beer in the Freezer," http://www.thekitchn.com/why-doesnt-alcohol-freeze-weve-got-chemistry-217962, 2 pages (2015).

Todd, "Iced Mocha with Coffee Cubes", URL: https://honestlyyum.com/4320/iced-mocha-with-coffee-cubes/, accessed Sep. 4, 2021, Honestly Yum, published Jun. 20, 2013 (16 pages).

"Loring™ S15 Falcon™, Convection Drum Roaster with Paddle Stirring," Technical Data Sheet, Downloaded from https://loring.com/wp-content/uploads/2015/11/Loring-S15_EN_Tech-data_1002695_revB.pdf, accessed on Apr. 28, 2016 (2 pages).

"Loring™ S35 Kestrel™, Convection Drum Roasterwith Paddle Stirring," Technical Data Sheet, Downloaded from https://loring.com/wp-content/uploads/2017/06/S35.pdf, accessed Apr. 28, 2016 (2 pgs.).

"Loring™ S70 Peregrine™, Convection Drum Roasterwith Paddle Stirring," Technical Data Sheet, Downloaded from https://documents.pub/download/loring-s70-peregrine-2017-06-01-technical-data-sheet-depending-on-roaster-model, accessed on Apr. 28, 2016 (2 pages).

Basile, M. and Kikic, I., "A Lumped Specific Heat Capacity Approach for Predicting the Non-stationary Thermal Profile of Coffee During Roasting," Chem. Biochem. Eng. Q., 23(2):167-177, 2009 (11 pages).

Brown, N., "A Quantitative Description of the Sounds of Cracks During Roasting," Downloaded from http://dailycoffeenews.com/2014/05/26/a-quantitative-description-of-the-sounds-of-cracks-during-roasting/ May 26, 2014, accessed on Apr. 28, 2016 (3 pages).

Escudero, D. R., "Paper 11656: Bed height and material density effects on fluidized bed hydrodynamics," Thesis, Iowa State University, Ames, Iowa (2010) (117 pages).

Fabbri, A., et al., "Numerical model of heat and mass transfer during roasting coffee using 3D digitised geometry," 11th International Congress on Engineering and Food (ICEF11), Procedia Food Science, 1:742-746, 2011 (5 pages).

Schwartzberg, H., "Batch coffee roasting; roasting energy use; reducing that use," Advances in Food Process Engineering Research and Applications, Part II, Springer Science and Business Media, New York, pp. 173-195, Sep. 13, 2013 (15 pages).

European Extended Search Report issued in European Application No. EP21200410.5, dated Jan. 27, 2022 (8 pages).

Corrochano, et al., "A new methodology to establish the steady-state permeability of roast and ground coffee in packed beds", Journal of Food Engineering, 150:106-116, 2015, available online Nov. 22, 2014 (11 pages).

Uman, et al., "The effect of bean origin and temperature on grinding roasted coffee", https://www.nature.com/articles/srep24483, Scientific Reports, 6, Article No. 24483, Apr. 18, 2016 (24 pages).

\* cited by examiner

| Description | Size (mm) | # of Particles | Increase in Parts/Gm | Ratio Increase | Area |
|---|---|---|---|---|---|
| Whole Bean | 6.0 | 6 | -- | -- | 8 |
| Cracked Bean | 3.0 | 48 | 42 | 1 | 16 |
| Coarse Grind | 1.5 | 384 | 336 | 8 | 32 |
| Regular Grind | 1.0 | 1296 | 912 | 22 | 48 |
| Drip Grind | 0.75 | 3072 | 1776 | 42 | 64 |
| Fine Grind | 0.38 | 24,572 | 21,500 | 512 | 128 |
| Espresso Grind | 0.2 | 491,440 | 466,868 | 11,115 | 240 |

Table 1: Particle Size vs. Number of Particles per unit Weight

FIG. 11

METHOD FOR CENTRIFUGAL EXTRACTION AND APPARATUS SUITABLE FOR CARRYING OUT THIS METHOD

RELATED APPLICATIONS

This Application is a National Stage Entry of PCT International Application No. PCTUS2018/029735 filed Apr. 27, 2018, which claims priority under 35 U.S. C. § 119(e) to U.S. Provisional Patent Application No. 62/490,630, entitled "Method for Centrifugal Extraction," filed on Apr. 27, 2017, and U.S. Provisional Patent Application No. 62/527,489, entitled "Method for Centrifugal Extraction," filed on Jun. 30, 2017, and U.S. Provisional Patent Application No. 62/585,403, entitled "Method for Centrifugal Extraction," filed on Nov. 13, 2017, all of which are incorporated by reference herein in their entirety.

TECHNICAL FIELD

The technical field relates generally to a method of and system for creating an extract, for example for making a consumable liquid food or beverage product, using a process of immersion and staged counter-current separation wherein the extraction equipment comprises one or more centrifuges specially designed for that purpose.

BACKGROUND

Industrial extraction processes, for example, the extraction of dissolvable solids from coffee grounds or tea leaves in water, have typically been done using a series of pressurized columns through which water is passed in a counter-current manner. This equipment system is commonly referred to as a column battery. It typically comprises 5-8 columns, of which 1 or 2 may be off-line at any given time for cleaning and refurbishment. Because flow occurs serially from one end of the battery to the other, the size of the particles must necessarily be larger than is common for other coffee brewing processes such as in an espresso machine or even for drip brewed coffee. This has important economic implications because it creates significant solubles concentration gradients, both through the diameter of the particles and along the length of each column. In the manufacture of high quality coffee extracts, a column in the battery must be taken off-line as soon as any part of the column nears the point of over-extraction, even though that means that much of the column is still under-extracted and that unused solubles will be wasted. A method is needed to more uniformly extract all the available coffee solubles without the risk of over-extraction and thereby tainting the final product quality.

SUMMARY

The techniques and systems described herein enable the use of one or a series of centrifuges, arrayed in a staged counter-current battery, to brew coffee or to extract other dissolvable solids from particles too small to use in a traditional column battery. The centrifuges are used both as a device for immersing the small particle solids in a non-flowing liquid and as a method for liquid/solid separation once the extraction process has reached equilibrium for a given stage.

In some embodiments, the method for extracting dissolvable solids from small particles uses two or more solid bowl centrifuges in a staged, counter-current process, wherein the mean particle size of the extractable solids is smaller than 50 microns.

In some embodiments, the centrifuges are used for (a) holding and agitating a dispersed mixture of small particles and an extraction fluid during one phase of the extraction process and (b) for separating particles and fluids in a second phase.

In some embodiments, the centrifuges are operated in the same manner as a column battery with centrifuges being removed and brought on line as the extractible solids are processed, so a steady-state batch process is maintained.

In some embodiments, the centrifuges include one or more of (a) a skimmer, (b) heating or cooling capabilities for the bowl, (c) ability to create an inert or nitrogen gas atmosphere around the bowl, (d) a removable bowl, and (e) a secondary pump to transfer solute from one centrifuge to another or to the packaging line.

In some embodiments, the centrifuge battery includes a grinding method for creating particles of the desired size range and distribution, e.g., a ball mill, a disc mill, a bead mill.

In some embodiments, the grinding method can be wet. If wet, the fluid can be water or extract from the immediately previous stage.

In some embodiments, the grinding method can be dry.

In some embodiments, the operating temperature of the system and/or the extract is established to control the maximum rate of dissolvable solids extraction from the small particles such that over-extraction is eliminated.

In one aspect of the invention, the production of a beverage extract comprises the steps of mixing a first liquid with a first set of coffee grounds having a total portion of unextracted material, extracting a portion of the unextracted material of the first set of coffee grounds into the first liquid and creating a first TDS percentage of the first liquid, separating the first liquid from the first set of coffee grounds using a centrifuge, mixing the first liquid having a first TDS with a second set of coffee grounds having a total portion of unextracted material, and extracting a portion of the second set of coffee grounds into the first liquid and creating a second TDS percentage of the first liquid, separating the first liquid from the second set of coffee grounds using a centrifuge, mixing a second liquid having a first TDS percentage and the second set of coffee grounds, extracting a portion of the second set of coffee grounds into the second liquid and creating a second TDS percentage of the second liquid, separating the second liquid and the second set of coffee grounds with a centrifuge, and homogenizing the first liquid and second liquid. In some embodiments, the total portion of unextracted material in the first set of coffee grounds is less than the total portion of unextracted material in the second set of coffee grounds before mixing the first liquid with the second set of coffee grounds, and the first TDS percentage of the second liquid is less than the second TDS percentage of the first liquid.

In some embodiments, the production of a beverage extract includes the step of chilling at least one set of coffee grounds.

In some embodiments, at least one step of mixing a liquid with a set of coffee grounds includes mixing the liquid with a set of coffee grounds in a centrifuge bowl.

In some embodiments, at least one step of mixing a liquid with a set of coffee grounds includes dislodging a set of coffee grounds from an interior of a centrifuge bowl.

In some embodiments, the step of dislodging a set of coffee grounds from an interior of a centrifuge bowl includes using at least one of scraping, rinsing, blowing, and agitation to dislodge a set of coffee grounds from the interior of the centrifuge bowl.

In some embodiments, at least one step of dislodging a set of coffee grounds from an interior of a centrifuge bowl includes repositioning the grounds from the interior surface of the centrifuge bowl to the middle interior of the bowl.

In some embodiments, at least one step of extracting a portion of a set of coffee grounds into a liquid includes at least one of agitating, chilling, heating, and pressurizing the liquid.

In some embodiments, at least one step of separating a liquid from a set of ground coffee grounds using a centrifuge includes using at least one of the centrifugal forces at a high rpm, a skimmer tube, a filter, and drainage system for separation.

In another aspect of the invention, a system for producing a beverage extract comprises a grinder, at least two centrifuges, a heat exchanger, a motor-driven dislodging mechanism, a supply of coffee grounds, a liquid supply, a mixing container, and a piping system.

In some embodiments, the piping system connects the centrifuges, a liquid supply and a mixing container. In some embodiments, a heat exchanger is positioned to heat or cool the liquid between centrifuges. In some embodiments, a motor driven dislodging mechanism is positioned near the brim of a centrifuge bowl to move a supply of coffee grounds to the middle of a centrifuge bowl.

In some embodiments, the system further comprises a modified atmosphere environment.

In some embodiments, the system further comprises an in-line refractometer.

In some embodiments, at least one centrifuge further comprises a skimming tube.

In some embodiments, at least one centrifuge further comprises a pump to suck extract from the centrifuge bowl.

In some embodiments, the centrifuge further comprises a sidewall with holes for liquid removal.

In a further aspect of the invention, a method includes countercurrently passing an aqueous medium through first and second serially connected centrifuges containing roast, ground coffee to produce coffee extract by drawing-off a first extract from the first centrifuge and passing the first extract to the second centrifuge; drawing-off a portion of a second extract from the second centrifuge; stopping the flow of the aqueous medium through the first centrifuge; serially connecting a third centrifuge containing roast, ground coffee to the second centrifuge and countercurrently passing the aqueous medium through the second and third centrifuges to produce coffee extract by drawing-off a third extract from the second centrifuge and passing the third extract to the third centrifuge; and drawing-off a portion of a fourth extract from the third centrifuge.

In some embodiments, the first centrifuge, the second centrifuge, and third centrifuge are different centrifuges.

In some embodiments, the first centrifuge and the third centrifuge are the same centrifuge, the serially connecting the third centrifuge to the second centrifuge includes coupling an outlet of the second centrifuge to an inlet of the third centrifuge, and the roast, ground coffee contained in the third centrifuge has not been extracted.

In some embodiments, the method further comprises supplying the roast, ground coffee contained in at least one of the first centrifuge or second centrifuge, the roast ground coffee comprising particles having a mean diameter of less than 100 microns.

In some embodiments, the method further comprises forming the roast, ground coffee having a mean diameter of less than 100 microns by grinding coffee in at least one of a ball mill, a disc mill, or a bead mill.

In some embodiments, the grinding of the coffee is wet grinding.

In some embodiments, the method further comprises dispersing the roast, ground coffee contained in at least one of the first centrifuge or second centrifuge in the aqueous medium; and agitating the roast, ground coffee contained in at least one of the first centrifuge or second centrifuge and the aqueous medium to promote diffusion of dissolvable coffee solids into the aqueous medium.

In some embodiments, the drawing-off of at least one of the first, the second, the third, or the fourth extract occurs during separation of the aqueous medium liquid and the roast, ground coffee.

In some embodiments, the method further comprises spinning at least one of the first, the second, or the third centrifuges to separate the aqueous medium and the roast, ground coffee.

In some embodiments, the drawing-off of at least one of the first, the second, the third, or the fourth extract comprises the use of a skimmer tube through which extract flows due to dynamic pressure imparted by spinning of the aqueous medium and the roast, ground coffee.

In some embodiments, the drawing-off of at least one of the first, the second, the third, or the fourth extract comprises the use of a skimmer tube in fluid communication with a pump to draw extract through the skimmer tube.

In some embodiments, the drawing-off of at least one of the first, the second, the third, or the fourth extract comprises propelling extract over an open edge of a centrifuge bowl; collecting extract within a casing of the centrifuge; and draining extract through an outlet in the centrifuge casing.

In some embodiments, the method further comprises scraping extracted roast, ground coffee from a sidewall of a bowl of the second centrifuge after drawing-off the portion of the second extract and before countercurrently passing the aqueous medium through the second and third centrifuges.

In some embodiments, the method further comprises heating at least one of the aqueous medium or the roast, ground coffee.

In some embodiments, the method further comprises cooling at least one of the aqueous medium or the roast, ground coffee.

In some embodiments, the method further comprises providing an inert atmosphere in an interior of a bowl of at least one of the first, the second, or the third centrifuge.

In some embodiments, the method further comprises removing a first bowl of the first centrifuge after stopping the flow of aqueous medium through the first centrifuge; and removing the roast, ground coffee contained in the first bowl of the first centrifuge.

In some embodiments, the method further comprises installing a second bowl in the first centrifuge; providing unextracted roast, ground coffee to the second bowl; and providing the first centrifuge with the second bowl as the third centrifuge containing roast, ground coffee.

In another aspect of the invention, a method includes combining a first liquid with a first set of coffee grounds, the first set of coffee grounds having extractable material; extracting a portion of the extractable material of the first set of coffee grounds into the first liquid to form a first extract having a first total dissolved solids (TDS) value; centrifuging the first extract and the first set of coffee grounds to form a first supernatant; combining a portion of the first supernatant with a second set of coffee grounds, the second set of coffee grounds having extractable material, the concentration of extractable material of the second set of coffee grounds being higher than the concentration of extractable material of the first set of coffee grounds after forming the first extract; extracting a first portion of the extractable material of the second set of coffee grounds into the portion of the first supernatant to form a second extract having a second TDS value, the second TDS value being higher than the first TDS value; centrifuging the portion of the first supernatant and the second set of coffee grounds to form a second supernatant; after forming the second supernatant, combining a second liquid with the second set of coffee grounds; extracting a second portion of the extractable material of the second set of coffee grounds into the second liquid to form a third extract having a third TDS value; and centrifuging the second liquid and the second set of coffee grounds to form a third supernatant.

In some embodiments, the second liquid has a fourth TDS value less than the difference between the first TDS value and the second TDS value.

In some embodiments, the method further comprises combining a portion of the second supernatant and a portion of the third supernatant.

In some embodiments, the method further comprises combining a portion of the third supernatant with a third set of coffee grounds, the third set of coffee grounds having extractable material, the concentration of extractable material of the third set of coffee grounds being higher than the concentration of extractable material of the second set of coffee grounds after forming the second extract; extracting a portion of the extractable material of the third set of coffee grounds into the portion of the third supernatant to form a fourth extract having a fourth TDS value, the fourth TDS value being higher than the third TDS value; and centrifuging the portion of the third supernatant and the third set of coffee grounds to form a fourth supernatant.

In some embodiments, the method further comprises grinding at least one of the first or the second set of coffee grounds to have a mean particle diameter of less than 100 microns.

In some embodiments, the grinding comprises using at least one of a ball mill, a disc mill, or a bead mill.

In some embodiments, the grinding of the coffee is wet grinding.

In some embodiments, the method further comprises heating at least one of the first liquid, the first supernatant, the second liquid, the first set of coffee grounds, or the second set of coffee grounds.

In some embodiments, the method further comprises cooling at least one of the first liquid, the first supernatant, the second liquid, the first set of coffee grounds, or the second set of coffee grounds.

In some embodiments, the method further comprises providing an inert atmosphere during at least one of extracting the portion of the extractable material of the first set of coffee grounds, centrifuging the first extract and the first set of coffee grounds, extracting the first portion of the extractable material of the second set of coffee grounds, centrifuging the portion of the first supernatant and the second set of coffee grounds, extracting the second portion of the extractable material of the second set of coffee grounds, or centrifuging the second liquid and the second set of coffee grounds.

In some embodiments, at least one of combining the first liquid with the first set of coffee grounds, combining the portion of the first supernatant with the second set of coffee grounds, or combining the second liquid with the second set of coffee grounds includes combining in a bowl of a centrifuge.

In some embodiments, at least one of combining the first liquid with the first set of coffee grounds, combining the portion of the first supernatant with the second set of coffee grounds, or combining the second liquid with the second set of coffee grounds includes dislodging at least one of the first or the second set of coffee grounds from a sidewall of a bowl of a centrifuge.

In some embodiments, dislodging at least one of the first or the second set of coffee grounds from the sidewall of the bowl of the centrifuge includes at least one of scraping the sidewall, rinsing the sidewall, impinging a gas against the sidewall, or agitating the bowl.

In some embodiments, dislodging at least one of the first or the second set of coffee grounds from the sidewall of the bowl of the centrifuge includes repositioning the at least one of the first or the second set of coffee grounds adjacent a central axis of the bowl.

In some embodiments, at least one of extracting the portion of the extractable material of the first set of coffee grounds into the first liquid, extracting the first portion of the extractable material of the second set of coffee grounds into the portion of the first supernatant, or extracting the second portion of the extractable material of the second set of coffee grounds into the second liquid includes at least one of agitating, cooling, heating, or pressurizing at least one of the first liquid, the first supernatant, or the second liquid.

In some embodiments, centrifuging the first extract and the first set of coffee grounds to form the first supernatant includes capturing the first supernatant in a skimmer tube.

In some embodiments, centrifuging the first extract and the first set of coffee grounds to form the first supernatant comprises propelling the first supernatant over an open edge of a centrifuge bowl; collecting the first supernatant within an outer casing of the centrifuge; and draining the first supernatant through an outlet in the centrifuge casing.

In some embodiments, centrifuging the first extract and the first set of coffee grounds to form the first supernatant further includes using a filter to separate the first set of coffee grounds from the first supernatant.

In yet another aspect of the invention, a system includes a liquid supply; a first centrifuge having a first bowl having sides, a first inlet, a first supernatant outlet, and a first movable bowl scraper configured to selectively reposition material adjacent to the sides of the first bowl away from the sides of the first bowl. The system also includes a second centrifuge having a second bowl, a second inlet, a second supernatant outlet, and a second movable bowl scraper configured to selectively reposition material adjacent to the sides of the second bowl away from the sides of the second bowl. The system also includes a grinder configured to supply particulate material to at least one of the first or the second centrifuge; and a reconfigurable piping system countercurrently coupling the liquid supply and the first or the second centrifuges, the reconfigurable piping system having a plurality of configurations. In a first configuration, the piping system supplies liquid from the liquid supply to the first inlet. In a second configuration, the piping system supplies liquid from the liquid supply to the second inlet. In a third configuration, the piping system supplies liquid from the first supernatant outlet to the second inlet. In a fourth configuration, the piping system supplies liquid from the second supernatant outlet to the first inlet.

In some embodiments, the system further comprises a third centrifuge having a third bowl; a third inlet; a third supernatant outlet; and a third movable bowl scraper configured to selectively reposition material adjacent to the sides of the third bowl away from the sides of the third bowl. The grinder is further configured to supply particulate material to at least one of the first, the second, or the third centrifuge. In a fifth configuration, the piping system supplies liquid from the liquid supply to the third inlet. In a sixth configuration, the piping system supplies liquid from the third supernatant outlet to the first inlet.

In some embodiments, the system further comprises a heat exchanger, wherein the reconfigurable piping system is configured to selectively couple the heat exchanger to at least one of the first or the second supernatant outlet.

In some embodiments, at least one of the first or the second centrifuges further comprising an inert gas supply inlet.

In some embodiments, the reconfigurable piping system including an in-line refractometer.

In some embodiments, at least one of the first or the second centrifuges further comprising a skimmer tube.

In some embodiments, the system further comprises a pump in fluid communication with the skimmer tube.

In some embodiments, the system further comprises a pump in fluid communication with an interior of at least one of the first bowl or the second bowl.

In some embodiments, at least one of the first or the second bowls including a perforated sidewall.

BRIEF DESCRIPTION OF THE DRAWINGS

Various objects, features, and advantages of the disclosed techniques can be more fully appreciated with reference to the following detailed description of the disclosed subject matter when considered in connection with the following drawings, in which like reference numerals identify like elements.

FIG. 11 shows a table that charts particle size versus the number of particles per unit weight for various coffee grind profiles, according to some embodiments.

DETAILED DESCRIPTION

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are exemplary, and that it is contemplated that there are other systems and methods that are within the scope of the disclosed subject matter.

Extraction processes, for example, the extraction of dissolvable solids from coffee grounds or tea leaves using water, are rate limited by the speed at which the solvent (e.g., water) can migrate into the body of a solid particle, dissolve various compounds, and return to the surface of the solid particle, adding its contents to the body of the solvent surrounding the particle. Thus, particle size is a major factor. The process is also governed by temperature, local equilibrium considerations, fluid dynamics (agitation, boundary layers, etc.), static/dynamic pressure, bean type and possibly other lesser factors.

Figure 1:
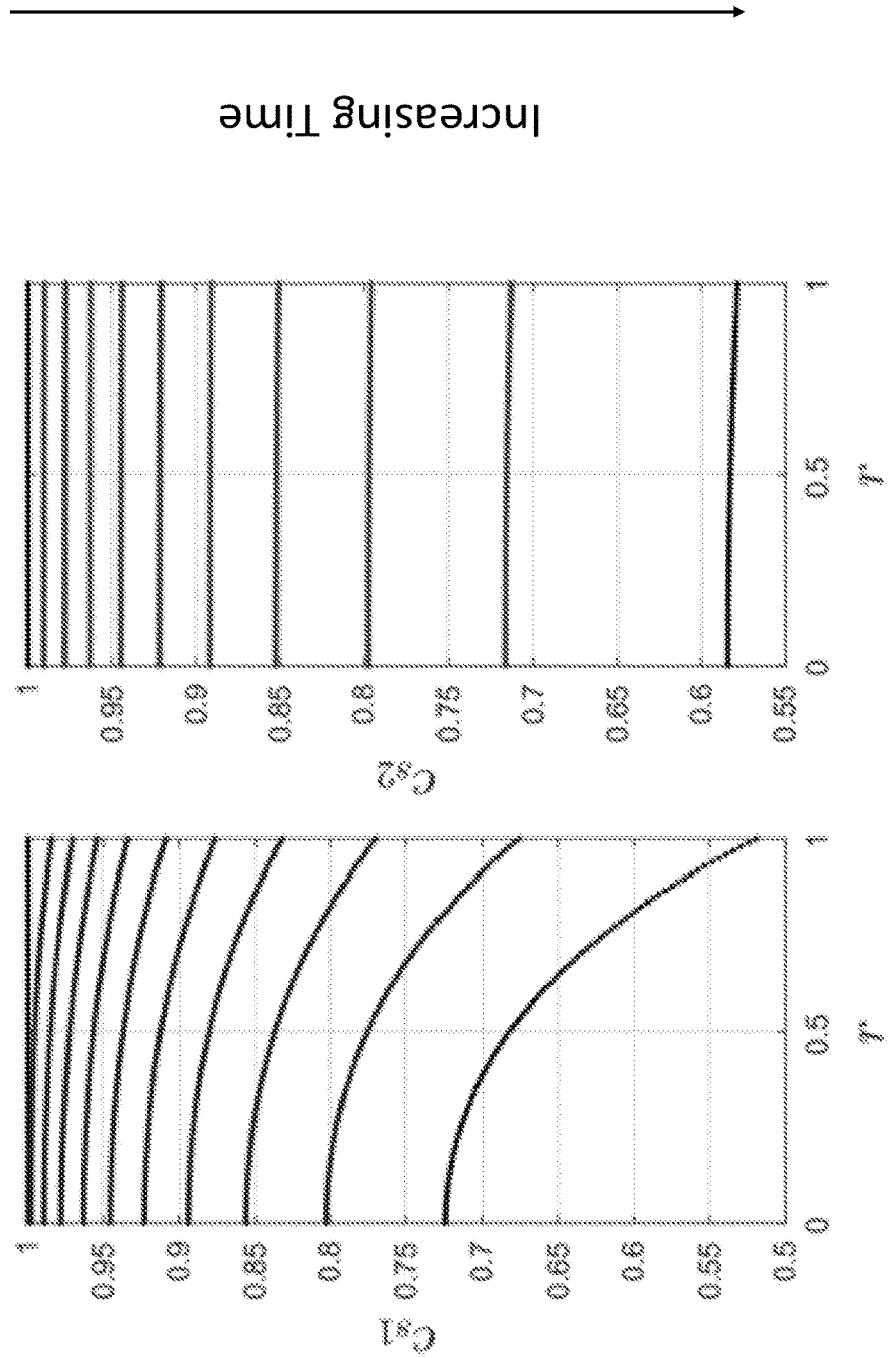
FIG. 1 is a set of graphs comparing calculated concentration gradients, as a function of time, for identical extraction process using particles of two different mean diameters, according to some embodiments.

Mathematical simulation of the dispersion process has identified significant differences in the concentration profiles of particles of different sizes as a function of time. FIG. 1 depicts the output of one such simulation. FIG. 1 illustrates changes in concentration of coffee solids contained within the bean over time, where r is the depth from the surface to the core of the particle. As shown in FIG. 1, multiple radial concentration profiles are shown for large and small particles. The horizontal axis shows the radius of the particle, where r=0 represents the core of the particle, and r=1 represents the surface. The vertical axis shows the concentration. Each line represents the concentration at a different time. As time increases (i.e., downward in FIG. 1), the concentration profile of compounds within the profiles decreases. A comparison is made between particles of representatively large size (left) and small size (right). It can be seen from this model that large particles have a significant concentration gradient between the surface and core, while the small particles extract more homogeneously. For example, for each progressive time profile for large particles, the difference between the concentration on the surface and the concentration at the center increases. By contrast, the gradient for small particles does not experience a substantial change over time. Accordingly, smaller particles, such as those with diameters of about 20 microns, dissolve compounds much more evenly and easily (i.e., have near instantaneous dispersion), thus increasing the extraction yield without over-extracting. By contrast, larger particles, such as those used in standard batteries (e.g., with diameters having orders of magnitude of around 100 or 1000 microns) leave large amounts of compounds in the center even as extraction time increases. As discussed in more detail in some embodiments of the present disclosure, counter-current centrifugal processes present a beneficial method of extracting compounds from particles of such sizes. According to an embodiment, small sized particles, for example of coffee grounds, are synergistic with countercurrent centrifugal extraction so as to produce a higher quality product while using less grounds (i.e., increasing extraction efficiency). Such centrifugal systems are particularly suited for extraction with small particle sizes.

This concentration gradient has major implications in terms of the overall extraction yield for a given process. Calculated extraction yield is ultimately an average of the yield for all parts of the extracted mass. Consider, for example, the implications related to guidance by the Specialty Coffee Association of America (SCAA) that ideal extraction rates are 18-22% by weight for most coffees. Concentration of the beverage also plays a significant role and is determined by mass ratio of water to coffee.

Given the observed difference in internal and external coffee concentrations for the larger particles, it is apparent that inhomogeneous extraction of large particles is inevitable, resulting in a large portion of the innermost mass of the grounds to be extracted below the target. To prevent the undesirable tastes associated with "over-extraction," the extraction target upper limit may be set such that the outer surface of large particles is not locally over-extracted nor are small particles over-extracted. This means that if the average allowable upper limit is 22%, the actual extraction of the surface might be 25% or even 30%, while the actual extraction at the core is closer to 19% or even 14%. In general, it would seem to be possible to optimize an extraction by using smaller grounds, thereby minimizing both waste and inhomogeneous extraction.

In a related issue associated with concentration gradients and averages, consider the implications on extraction yield of the primary means of industrial coffee extraction practiced throughout the world—a column battery of 5-8 packed columns through which hot water is flowed through stationary grounds in a sequential/series direction, creating a counterflow dynamic. For those portions of the process wherein the average extraction within a column is well below the ultimate possible extraction (including steps to hydrolyze otherwise insoluble portions of the bean), there is a concentration gradient like that shown in FIG. 1 which exists between the end of the column where the liquid is introduced and the end of the column where the liquid exits. Thus, if the goal is to produce a very high quality (as measured by taste and aroma) extract, the extraction yield at the most highly extracted end of the column (where the liquid enters) must be limited below the point of "over-extraction" before any off-tastes are introduced into the flow and taint the taste and quality of the overall batch. Removing a column from the battery (for recycling) at this point means that the opposite end of the column is significantly under-extracted, with negative economic implications. Such negative economic implications may include, for example, a larger amount of solid product used and/or a longer time required for extraction.

A step to address the first issue, i.e., the concentration gradient across the radius of a particle, is to shift the distribution center point to smaller particle sizes when whole beans are processed into grinds. As shown in FIG. 1, once particles are small enough, this will result in extraction across the full diameter of a particle becoming almost uniform on practical time scales. To the degree that shifting the particle size distribution to smaller particles also causes the particle sizes to become more uniform—extraction uniformity is further enhanced.

Figure 2A:
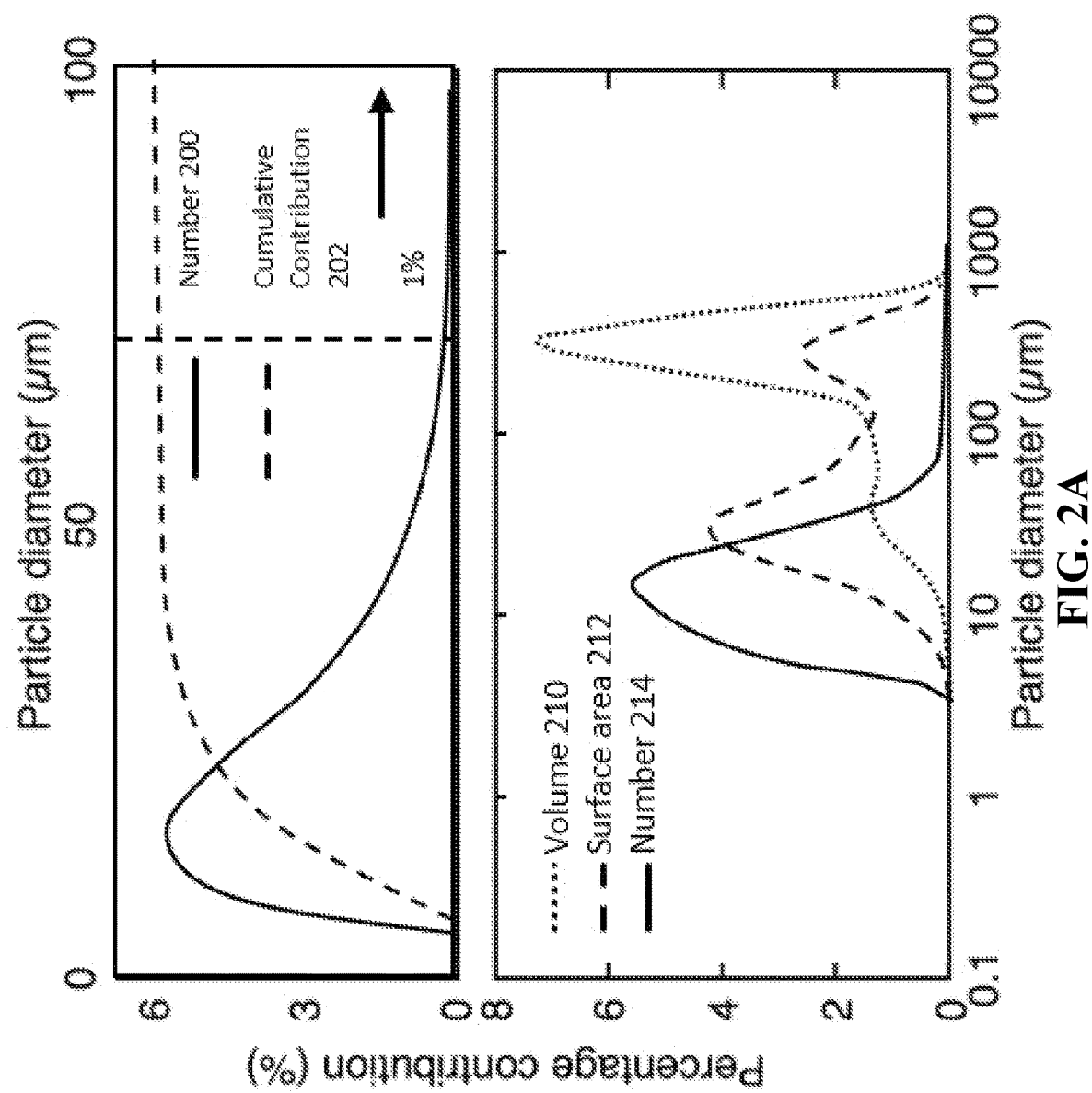
FIGS. 2A-2B show a set of graphs presenting various statistical distribution details for a population of particles generated by a specific grinding process, according to some embodiments.
Figure 2B:
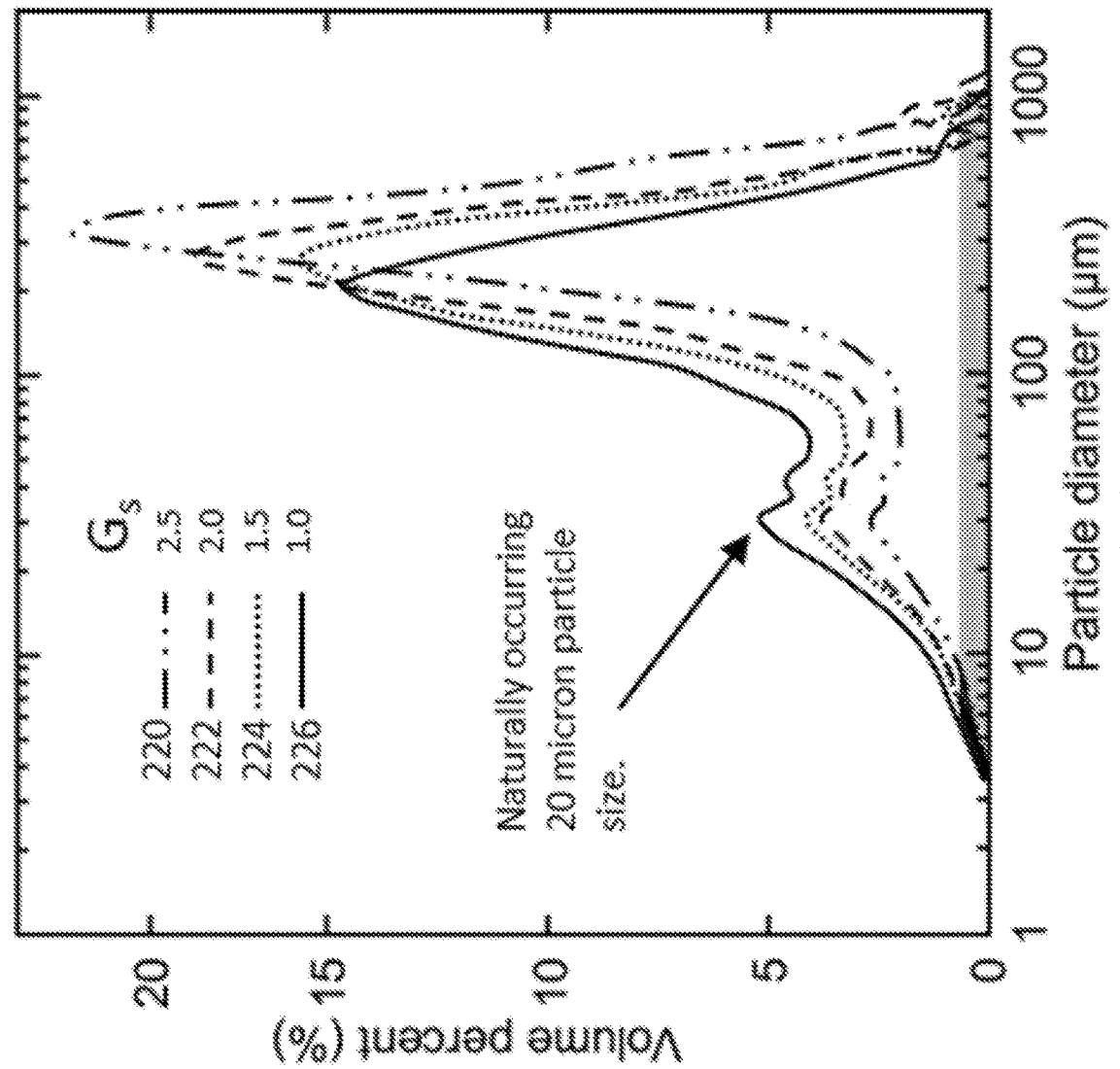

FIG. 2B, which was obtained from https://colonnaandsmalls.wordpress.com/2015/10/, shows four particle diameter distributions based on volume percent. In particular, the percentage of the total volume of the grinds is shown on the vertical axis as a function of particle diameter on the horizontal axis. Each of the four distributions 220, 222, 224, and 226 represent increasingly more finely ground sample sets. For example, distribution 220 may have been ground on a coarse setting 2.5, while distribution 226 may have been ground on a fine setting 1.0. As described further below and illustrated in FIG. 2B, it has been observed, for example, that particles of approximately 20 microns diameter seem to be a "natural" particle size occurring along fracturing lines when a larger particle fractures. Each of distributions 220, 222, 224, and 226 show a secondary peak in volume percentage corresponding to particles with diameters of approximately 20 microns, regardless of the grind size. Thus, if the median particle size target was approximately 20 microns, the natural fracture properties of coffee particles would promote a narrower distribution around this mean. Not only will a smaller grind size make the concentration gradient distribution smaller, but it will also reduce the time needed for dissolution. Furthermore, a more consistent particle size makes for more consistent usage of the grinds, since the system may be tuned to the particular particle size, rather than accommodating a variety of sizes.

At some point in the process of reducing particle size, extraction rates may become so rapid that is will be necessary to reduce the extraction temperature to keep the reaction from occurring too rapidly so as to prevent over-extraction. This presents some benefits.

Data illustrating the particle size distribution associated with coffee grounds from one exemplary type of equipment are shown in FIG. 2A, which was obtained from https://www.nature.com/articles/srep24483. In FIG. 2A, the horizontal axis represents particle diameter, and the vertical axis represents the percentage contribution to the total set of all particles associated with that particle diameter. The top panel details the size of particles produced by a sample grinder. The solid line 200 represents the number (in percent) of particles for a given distribution from a sample grinder. The dotted line 202 represents the cumulative contribution to the total number (in percent) of all particles having a diameter smaller than the diameter on the horizontal axis. The vertical dotted line on this graph represents the 99% cutoff, which here occurs at ~70 micrometers.

The lower panel shows various characteristics of a distribution of particles, according to an embodiment. As shown in the bottom panel of FIG. 2A, the distribution of the number of particles is represented by solid line 214. The distribution is centered slightly above 10 micrometers. Dashed line 212 shows the surface area contribution from particles of a given diameter for a similar particle distribution, according to an embodiment. As shown in FIG. 2A, the distribution is bimodal, with particles between 10-100 micrometers, and particles between 100-1000 micrometers each showing peaks corresponding to increasing contributions to the surface area. Finally, the dotted line 210 represents the volume contribution from particles of a given diameter for a similar particle distribution, according to an embodiment. As shown in FIG. 2A, the distribution is also bimodal. The various representations of the particle size distribution shown in the lower panel demonstrate the nature of ground coffee: most particles are small, giving rise to high surface area. One large particle, however, occupies many orders of magnitude more volume and contributes about 25% to the surface area in the spherical approximation of the distribution shown. (Spherical representation is reasonable as discussed in an article entitled "A new methodology to estimate the steady-state permeability of roast and ground coffee in packed beds" by B. R. Corrochano, et. Al. from The Journal of Food Engineering, 150 (2015) 106-116.) "Boulders," or a small number of larger particles relative to the other particles can have substantial contributions to the total surface area and volume distributions, even if they are relatively few in number. Fortunately, it has also been shown that grinding finer makes more fines of the same size, while reducing the size and contribution of the "boulders." More consistent particle sizes, particularly those of smaller sizes such as diameters around approximately 20 microns make for more consistent and efficient extraction.

The downside of particle size reduction, at least for coffee, is that practical flow rates through a packed battery column become impossible at some point as particle sizes decrease. Coffee particles are easily deformable under pressure and the size of the interstitial spaces between grinds are small to begin with, so with even small pressure concentration gradients needed to induce flow, these spaces are closed off and the bed quickly becomes an impermeable mass.

One way to address this flow problem as well as the problem of extraction concentration gradients along the length of a column is to simply eliminate the flow. If instead of a packed column wherein the water is flowed from one end to the other through stationary grinds, the coffee grinds and the water are held stationary in a steeping process like that used for tea (other than localized movement/agitation wherein the grinds and the water generally move together), both problems disappear. This dispersed-grinds model, with agitation and the use of small particle sizes, will result in a uniform equilibrium being established throughout the extraction volume and across the radius of each particle. This uniform distribution throughout the extraction volume and across the radius means that the average extraction for the system and the localized extraction at any point in the system are essentially the same. Under these conditions, it should be possible to shift the extraction guidance offered by the SCAA of 18-22% (average) for a "gold cup" to something considerably higher, e.g., 24-28% (uniform), i.e., to achieve an average and uniform extraction throughout the system equivalent to what is currently achieved only at the surface of large particles. This change in extraction methods thus offers potentially huge economic value without compromise to overall quality. Such economic value may include a reduction in the amount of solid product used and/or a decrease in the time required for extraction.

The concentration equilibrium that is established within this dispersed particle mixture controls the absolute amount of extraction of the grinds that can be achieved within a single stage. If the goal of the industrial process is to achieve a low extract concentration, for example, a TDS (total dissolved solids) value of 5%-10% or lower, a relatively higher volume of water can be used for extraction and this goal can be accomplished in a single stage. If the concentration goal is higher, for example 20%-30% TDS as would be needed for creating an 8-ounce "gold cup" of coffee from ⅓-½ ounce of extract, a lower volume of water must be used, and multiple extraction stages are needed.

For high TDS extracts of coffee, the change to a dispersed-grinds, small particle method creates a new problem: how to separate the small particles and the extract effectively and efficiently to support a multi-stage extraction process.

Liquid/solid separation may be accomplished by a variety of methods. Such methods may include, but are not limited to various methods of pretreatment, solids concentration, solids separation, and posttreatment.

According to an embodiment, separation may be accomplished via centrifugation. As described in more detail in the present disclosure, centrifuges may be implemented in a system optimized for a small-particle, multi-stage, counter-current, and/or dispersed model extraction.

The method disclosed is a bank of one or more centrifuges set to support a single stage or multiple stage, counter-current processing of small particles of an extractible solid dispersed in a liquid solvent. For the purposes of this disclosure, the description will be limited to coffee grinds dispersed in water (or a water-based extract), but it should be understood that the process can be used for the extraction other materials. Liquid extracted from a centrifuge may be identified as a supernatant. Such liquid may be produced, for example, by spilling liquid over the brim of a bowl of a centrifuge, capturing liquid by a skimmer, capturing liquid through perforations in the bowl, and/or other known techniques for obtaining liquids separated from remaining solids.

Figure 5:
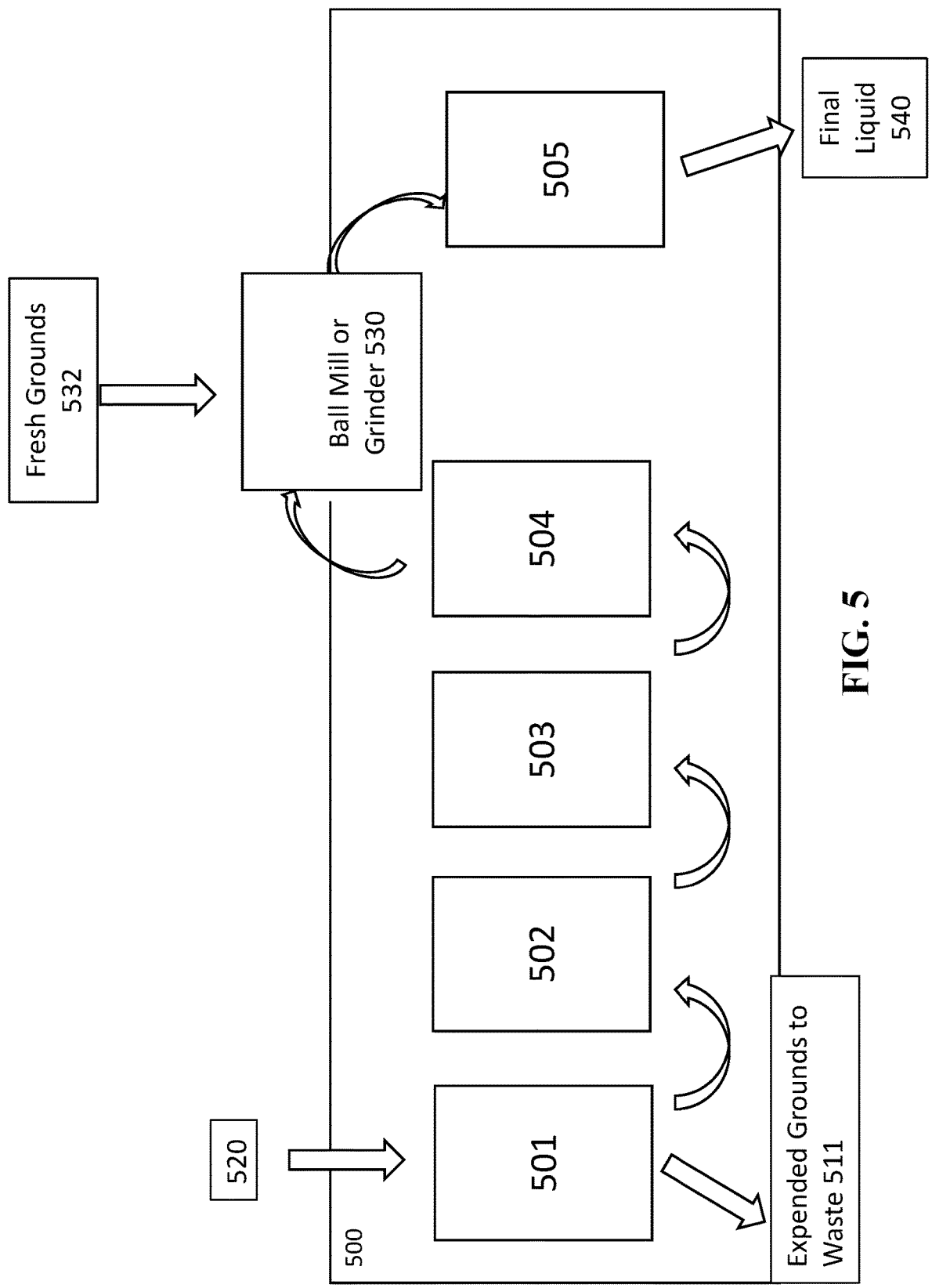
FIG. 5 illustrates the organization of a counter-current centrifuge battery, according to an embodiment.

Referring to FIG. 5, the centrifuges to be used in the bank are similar in most respects to those already known for batch processing of small particles. As shown in FIG. 5, battery 500 contains centrifuges 501, 502, 503, 504, and 505 which contain grounds with increasing levels of use. Fresh liquid source 520 provides water to the centrifuge 501 having the grounds from which the highest amount of solids have already been extracted. Fresh liquid is provided in amount equal to the planned output of final liquid extract 540 plus the water expected to be absorbed by the grounds in centrifuges 501, 502, 503, 504, and 505. Centrifuge 501 may mix the liquid and grounds, and provide separated liquid to centrifuge 502, which has the grounds with the next highest amount of solids previously extracted. This process continues from each centrifuge to the next, until final liquid extract 540 is output from centrifuge 505. In some embodiments, spent grounds 511 may be expelled from centrifuge 501. As discussed in more detail below, a new centrifuge may be swapped in or centrifuge 501 may be replenished with fresh grounds. In some embodiments, the centrifuge bowl is removable for cleaning. In some embodiments, the centrifuge bowl includes provisions for slow-speed agitation of the dispersed/mixed fluid, like the provisions of the "bowl" found in clothes washing machines. In some embodiments, the bowl is a solid wall bowl, i.e., it does not contain perforations that can act as a filter element, allowing liquids or solids to pass through. In some embodiments the centrifuge includes a skimmer tube. In some embodiments, the skimmer tube can be lowered into or retracted from a rotating liquid as the bowl spins. In some embodiments, the centrifuge includes a scraper that is configured and positioned to wipe the wall of the bowl clean of layered solids.

According to some embodiments, reconfigurable piping is provided between some or all of the centrifuges 501, 502, 503, 504, 505 in the battery 500. The reconfigurable piping may take many forms, such as, for example, a system of interconnected piping between centrifuges with valves (and optionally pumps) that allow liquid to pass from various points in the centrifuges to some or all of the other centrifuges. Accordingly, liquids may be selectively passed between centrifuges connected via the reconfigurable piping. According to some embodiments, a computer may control the configuration of the reconfigurable piping, either manually, automatically, or some combination between the two. According to some embodiments, the reconfigurable piping may be controlled manually. According to some embodiments, the location of fresh liquid source 520, expense grounds to waste 511, ball mill grinder 530, and or final liquid exit 540 may be reconfigurable, and may comprise more than one of each of these listed elements.

According to some embodiments, refractometers may be placed in the centrifuges and/or at other locations such as in reconfigurable piping. The refractometer may determine measurable characteristics of the liquid (e.g., the TDS value of the coffee extract or coffee extract precursors). Such characteristics may be passed to a computer to control various aspects of the extraction process, for example in a feedback loop. Such aspects may include, but are not limited to the temperature at certain points in the battery, the centrifuging times and/or speeds, the number of stages of centrifuges to be used, when new grounds are added and old grounds dispensed of, the configuration of the reconfigurable piping (and therefore the flow path between centrifuges of liquid at various stages in the extraction process), the use of elements such as skimmer tubes and scrapers, or any other controllable aspect of the extraction process. According to some embodiments, additional sensors may be used in the feedback loop such as, but not limited to flow meters, temperature sensors, flow path sensors, and/or humidity sensors.

In practice, the bowl of the centrifuge at each stage is first used to contain and mix the water and grinds. As such, when the grinds and water (or extract/solute from a previous stage) are first added to the bowl, the bowl is stationary or moving very slowly. Once the intended volume of the mixture has been added to the bowl, the bowl may be oscillated/rotated back and forth to facilitate thorough mixing of the liquid/solute and grinds to enhance dispersion of the dissolvable solids contained within the coffee grinds and quickly reach equilibrium for that stage of the battery. In some embodiments, the grounds are added first into the bowl. In some embodiments the external liquid is added first into the bowl. In some embodiments a grinder is positioned above the centrifuge, so coffee is ground directly into the bowl. In some embodiments, a liquid source is positioned next to the coffee ground source to simultaneously add grounds and liquid in the bowl in a misting, pre-wetting fashion.

Figure 6A:
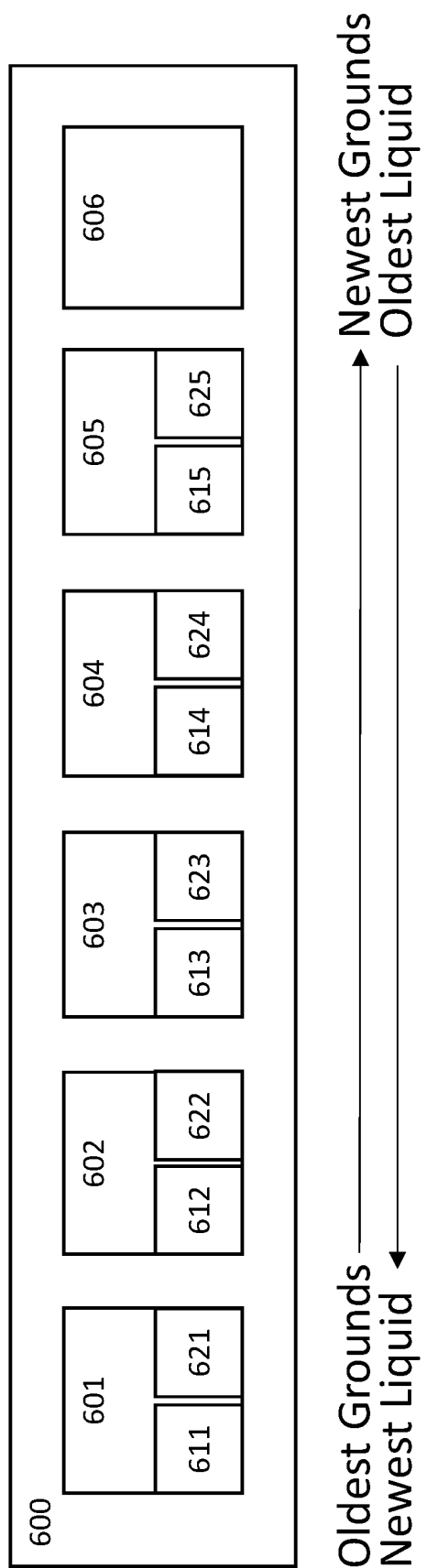
FIGS. 6A, 6B, 6C, 6D, 6E, and 6F show the operation of a counter-current centrifuge battery, according to an embodiment.
Figure 6B:
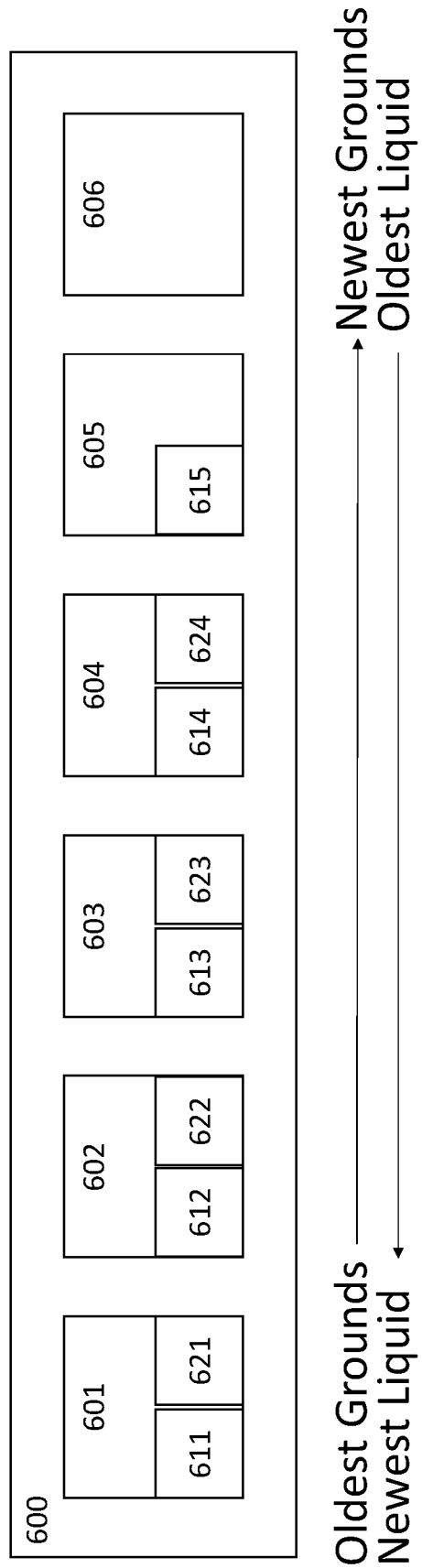
Figure 6C:
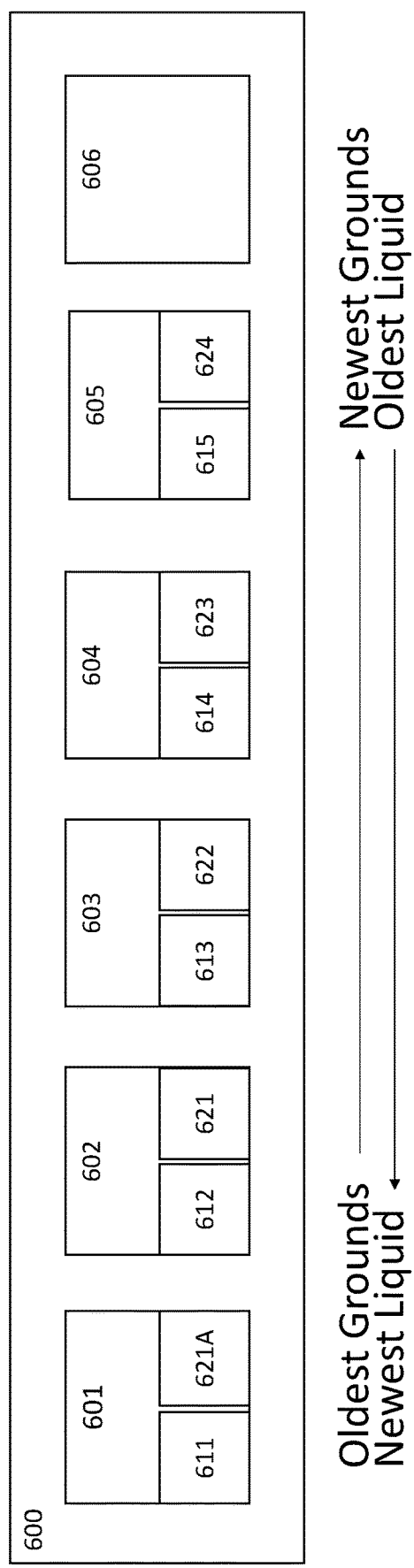

FIGS. 6A-6F show examples extraction processes according to some embodiments. FIGS. 6A-6C show the operation of a counter-flow extraction process, according to an embodiment. As shown in FIG. 6A, battery 600 includes centrifuges 601, 602, 603, 604, 605, and 606. In an arbitrary initial state, centrifuges 601, 602, 603, 604, 605, and 606 contain grounds 611, 612, 613, 614, and 615, respectively, in order from oldest (i.e., subjected to the most number of new cycles) to newest. Centrifuges 601, 602, 603, 604, 605, and 606 also contain liquid 621, 622, 623, 624, and 625, respectively, in order from newest (i.e., freshest) to oldest (i.e., subject to the most amount of grounds and thus having a higher concentration of, e.g., coffee). According to an embodiment, the liquid 625 may be separated and extracted, as shown in FIG. 6B. As shown in FIG. 6C, the liquid 621, 622, 623, 624, 625 from each centrifuge 601, 602, 603, 604, 605 respectively may be moved to the next centrifuge through known plumbing techniques (i.e., to centrifuges 602, 603, 604, 605, 606). Fresh liquid 621A, such as water not yet subject to the extraction process, or water from an earlier stage, may be provided to centrifuge 601. These steps may be repeated a number of times to achieve a desired result.

According to some embodiments, the liquid 621 shown in FIG. 6A may have a first TDS value. After being mixed in centrifuge 602 with the grounds 612 as shown in FIG. 6C, the liquid 621 may be extracted again at a second TDS value and provided to centrifuge 603. According to an embodiment, the second TDS value may be higher than the first TDS value. According to an embodiment, after mixing with the grounds 613 in centrifuge 603, the liquid 621 may be extracted at a third TDS value. According to an embodiment, prior to mixing with the liquid 621, grounds 612 may have a higher concentration of extractable material than the grounds 611 prior to mixing with the liquid 621. According to some embodiments, another liquid is then provided in the grounds 613 in centrifuge 603 and extracted to form another liquid with a fourth TDS value. According to some embodiments, the fourth TDS value may be less than the TDS value gained by the third TDS value relative to the second TDS value. Accordingly, extracted liquids of various TDS values and concentrations of extracts may be produced using the same system. Some or all of the additional centrifuges shown in FIGS. 6A-6F may not be required for this process.

Figure 6D:
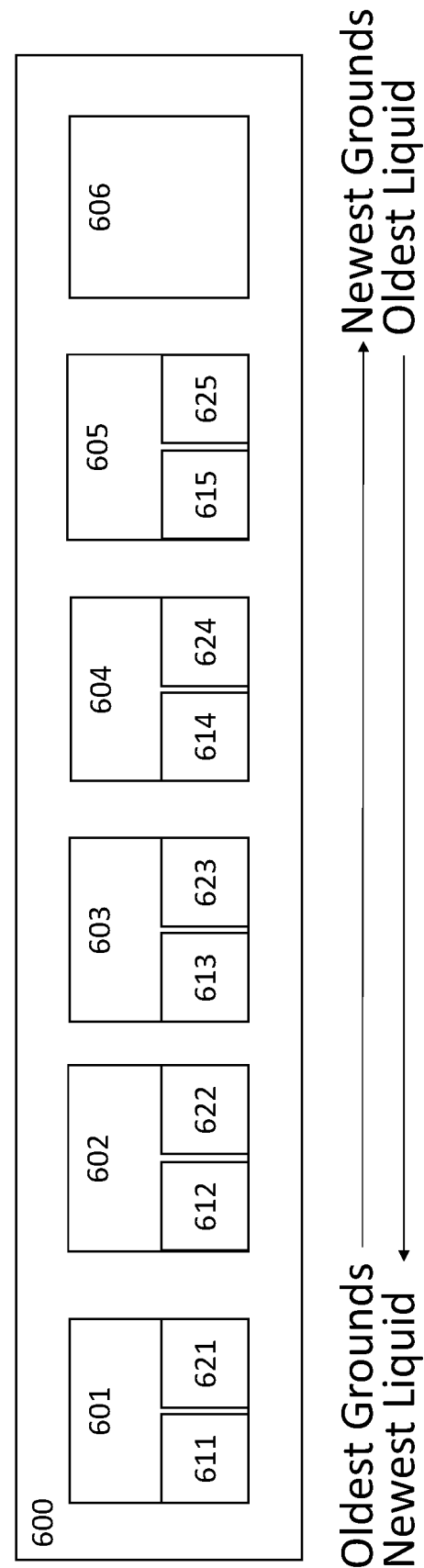
Figure 6E:
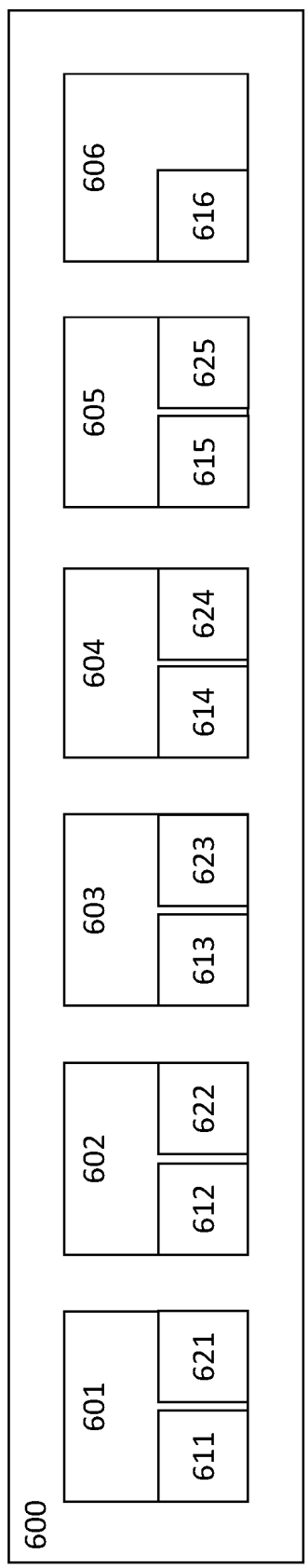
Figure 6F:
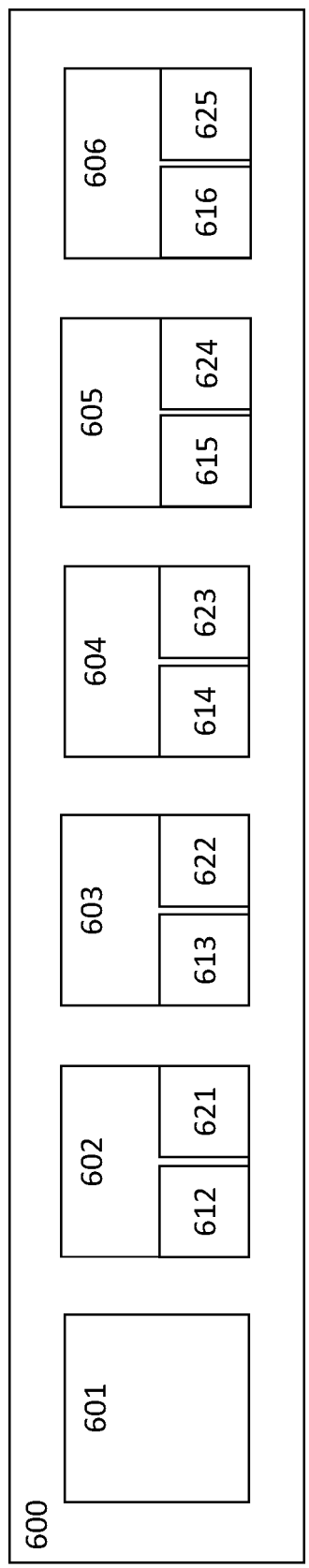

FIGS. 6D-6F show the removal of a centrifuge, for example, to add new grounds or to clean the centrifuge, according to an embodiment. As shown in FIG. 6D, battery 600 includes centrifuges 601, 602, 603, 604, 605, and 606. In an arbitrary initial state, centrifuges 601, 602, 603, 604, 605, and 606 contain grounds 611, 612, 613, 614, and 615, respectively, in order from oldest (i.e., subjected to the most number of new cycles) to newest. Centrifuges 601, 602, 603, 604, 605, and 606 also contain liquid 621, 622, 623, 624, and 625, respectively, in order from newest (i.e., freshest) to oldest (i.e., subject to the most amount of grounds and thus having a higher concentration of, e.g., coffee). According to an embodiment, a user may want to substitute in centrifuge 606. As shown in FIG. 6E, fresh grounds 616 are added to the centrifuge 606. As shown in FIG. 6F, the liquid 621, 622, 623, 624, 625 may be moved from centrifuges 601, 602, 603, 604, 605 to centrifuges 602, 603, 604, 605, 606, respectively. The oldest grounds 611 may also be removed from centrifuge 601.

According to an alternative embodiment, more or fewer centrifuges may be used. The method may be practiced, for example, with as few as two or one centrifuge(s). According to an embodiment, for a two-centrifuge system, liquid may be passed into the first centrifuge with grounds contained therein. After mixing, extract may be drawn and passed to a second centrifuge also containing grounds therein. Extract may then be drawn from the second centrifuge and passed back into the first centrifuge. When receiving extract from the second centrifuge, the grounds in the first centrifuge may have already been replaced with unextracted grounds (e.g., fresh grounds). After mixing, the liquid in the first centrifuge may be extracted to form another extract. This extract may form a final beverage product. According to some embodiments, extract may be passed between the two centrifuges additional times using similar extract passing and grounds replacement steps.

According to some embodiments, the bowls are removable. In such a system, fewer centrifuges may be used, and the bowls simply replaced with different grounds having different amounts already extracted therefrom. According to an embodiment, only a single centrifuge is needed, and at least two bowls may be used to accomplish the countercurrent extraction method described above.

Provisions may be made to measure the temperature of the bowl's contents and then heat or cool the bowl and its contents using some external fluid or other devices acting through the wall of the bowl or directly on the volume of the fluid using microwaves, RF methods, heated nitrogen gas, or others. In addition, refrigeration components or other coolants, like liquid nitrogen may be used to cool grounds and liquid by chilling the mixture or bowl directly. The environment around the bowl may be controlled to prevent evaporation of the water (e.g., maintaining a high humidity environment) and controlled to prevent oxidation of the particles (e.g., maintaining an inert gas or hot or cold nitrogen environment). This mixing condition may continue for several minutes or not at all, depending on the size of the particles, temperature, etc., to achieve the intended equilibrium concentration of dissolvable solids in the liquid phase. In some embodiments, a rod may be inserted into the bowl to create a stirring effect on the grounds while the bowl remains idle. Alternatively, a rod may be incorporated into the bottom radius of the bowl and may or may not be rotated around its own axis, like a blade in a blender, to create a centrifugal or reciprocating stirring feature to promote equal extraction. This rotating tool may include a scraper that is angled to push grounds to the center of the centrifuge. In some embodiments, heating and/or cooling coils and heat exchangers may be inserted and/or configured into the centrifuge bowl to regulate temperature.

In some embodiments, the external liquid added to the bowl varies and is added into the centrifuge in different stages. For example, a hot liquid may be added into the centrifuge to create a mixture and then a colder liquid may be added into the mixture to chill the mixture. In some embodiments, the centrifuge has a computer controller and temperature sensor that may automatically adjust the temperature of the mixture or centrifuge bowl to control and achieve extraction equilibriums for different levels of temperatures and amounts of water.

Figure 7A:
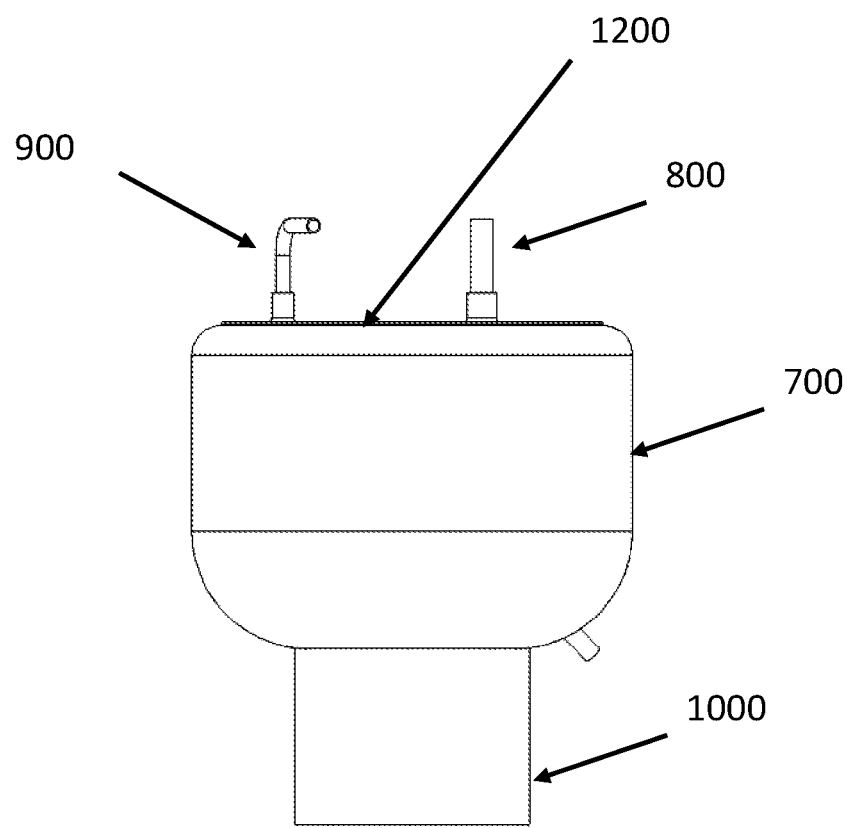
FIGS. 7A, 7B, and 7C show views of a centrifuge, according to an embodiment.
Figure 7B:
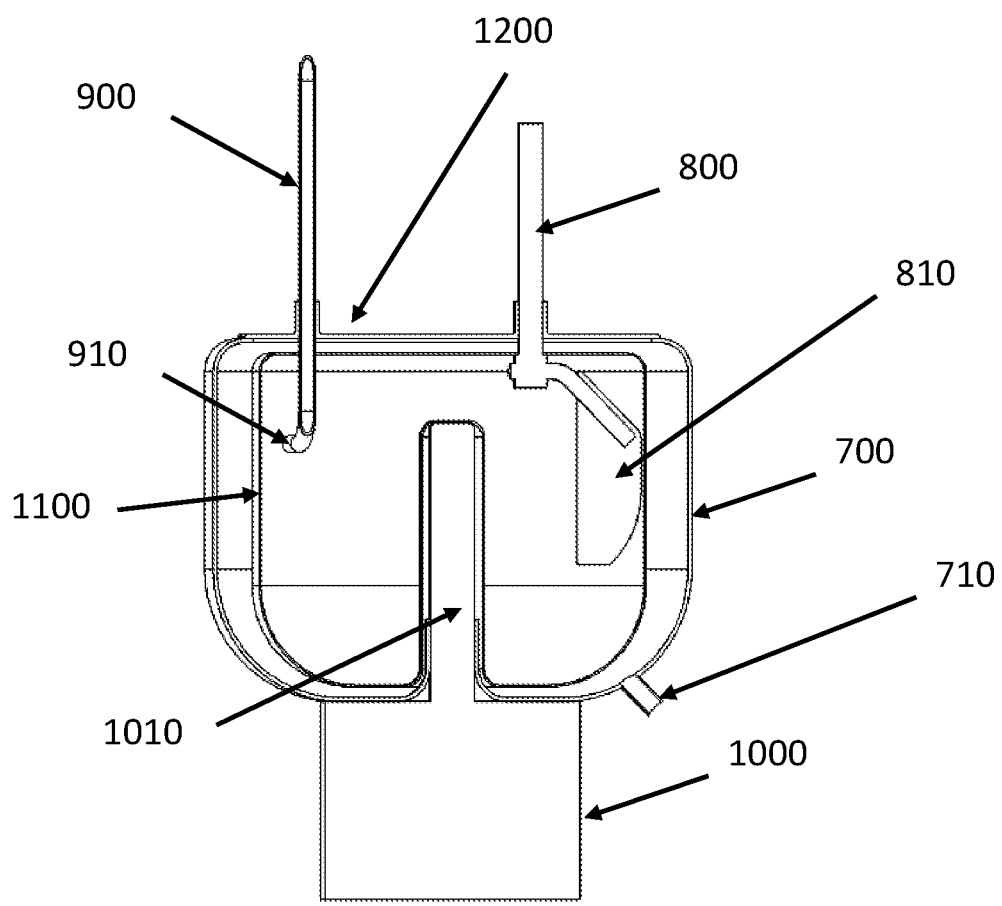
Figure 7C:
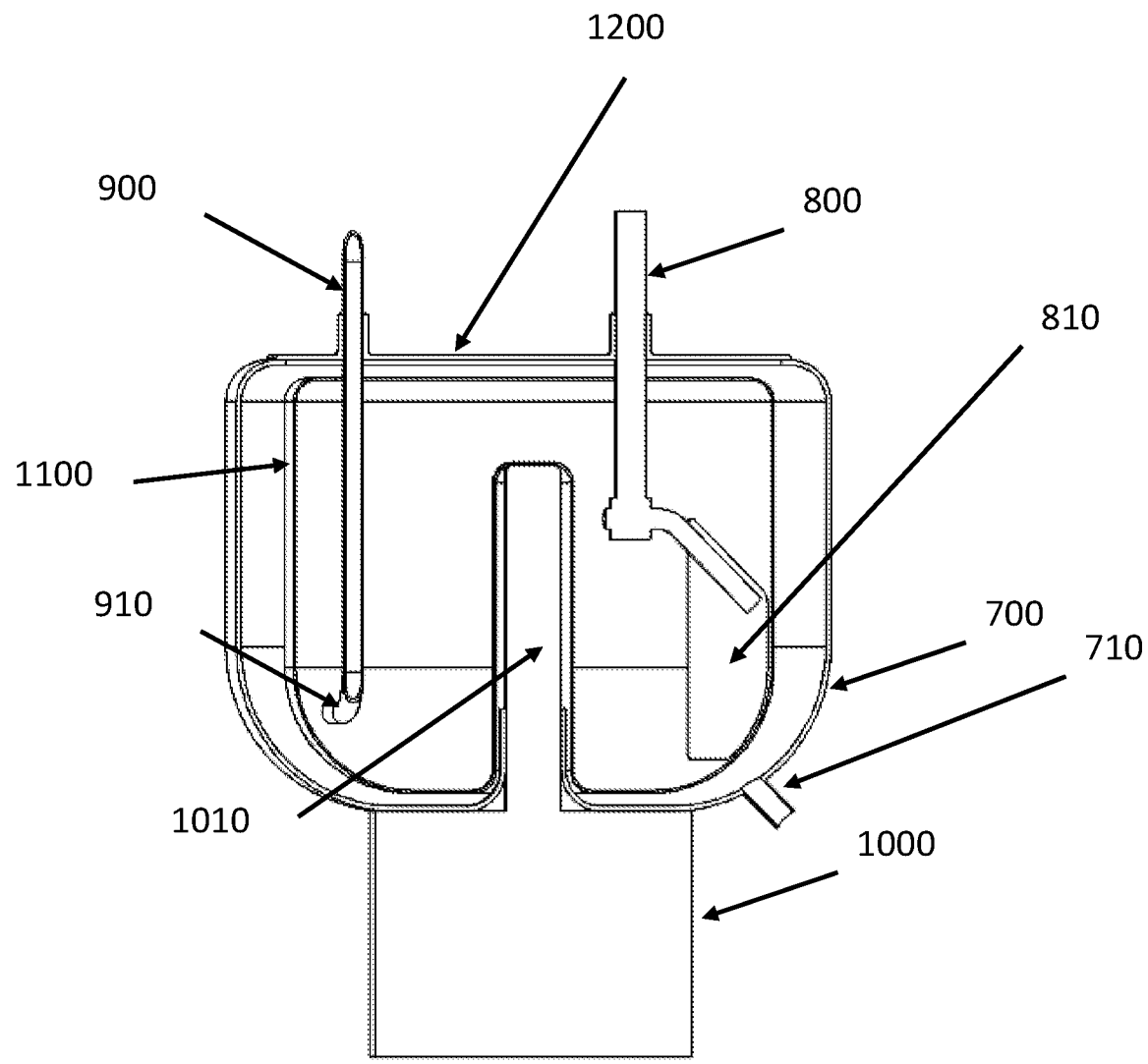

FIGS. 7A-C show a centrifuge according to some embodiments. FIG. 7A illustrates a simplified external view of a centrifuge. It comprises an external casing 700, a scraper assembly 800, a skimmer tube 900, a drive motor 1000, and a lid 1200. The scraper 800 and skimmer tube 900 are both shown in engaged positions, i.e., inserted deeply into the centrifuge bowl.

FIG. 7B illustrates a section view of the centrifuge of FIG. 7A, according to an embodiment. As shown in FIG. 7B, scraper 800 and skimmer tube 900 may be retracted upward. The centrifuge may comprise a centrifuge bowl 1100, a casing drain 710, a drive shaft 1010 from motor 1000, a scraper blade 810, and skimmer tube fluid entrance 910. During operation, the motor 1000 causes drive shaft 1010 to spin, thereby causing motion in the centrifuge, for example by blades affixed to a wall or a separate element, spinning, or other methods. Casing drain 710 may allow liquid to exit, as is described throughout the present disclosure.

FIG. 7C illustrates similar components as FIG. 7B, according to an embodiment. As shown in FIG. 7C the skimmer tube 900 and the scraper 800 have been lowered into the bowl 1100 to either pickup fluids from the bottom of bowl 1100 or scrape the curved internal bottom corner of bowl 1100, respectively. Either scrapper 800 or skimmer tube 900 may be left out, or the two may be used together, or with a combination of other mixing and extraction elements. According to an embodiment, skimmer tube 900 and scraper 800 are not lowered as shown in FIG. 7C at the same time. According to an embodiment, first skimmer tube 900 is lowered into the rotating fluid to draw off the finished extract from that stage of extraction/separation. Then, when the desired quantity of fluid has been removed, skimmer tube 900 can be retracted upward and scraper 800 can be lowered into place to dislodge coffee solids from the internal wall of bowl 1100 and move them back into the center section of bowl 1100 for either the next round of fluid extraction or for easy removal from the bowl (for final disposal of the grounds and cleaning of the bowl).

Figure 8:
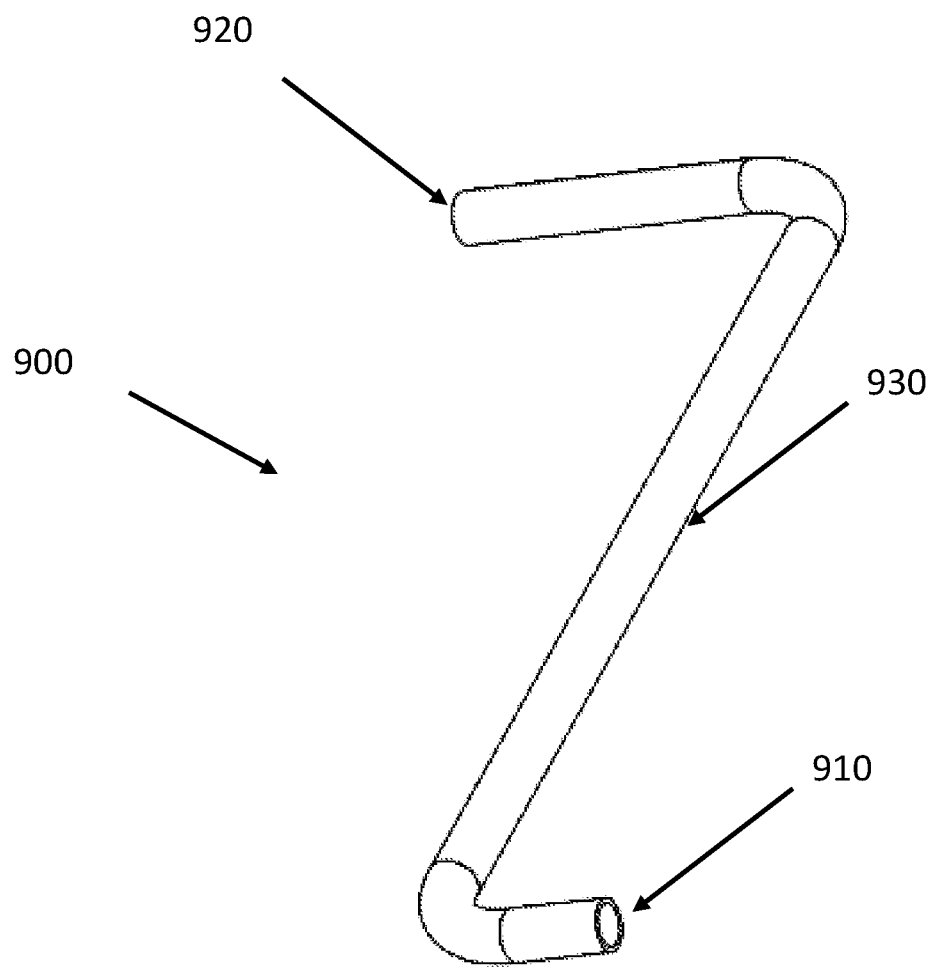
FIG. 8 is an isometric view of a skimmer tube, according to an embodiment.

FIG. 8 illustrates a skimmer tube 900, according to an embodiment. Skimmer tube 900 may comprise a fluid entrance end 910 that can be immersed into a spinning liquid extract to extract the liquid, a tube exit end 920 that can be connected to an intermediate pump or feed extract to the next stage using the dynamic pressure of the spinning liquid to drive flow, and a vertical section 930 that allows travel between retracted and immersed positions within the bowl of a centrifuge.

According to an embodiment, different extraction elements may be used. For example, the centrifuge may contain a bowl with an opening near the top, such as an open edge. Motion imparted upon the centrifuge via spinning or other motion imparting elements may propel the liquid contained therein over the edge. Such liquid may form the extract to be provided to another centrifuge or as a final liquid extract. According to some embodiments, the liquid propelled over the edge of the centrifuge bowl may be collected within the centrifuge casing and drained as extract through an outlet, such as outlet 710 shown in FIG. 7B.

Figure 9:
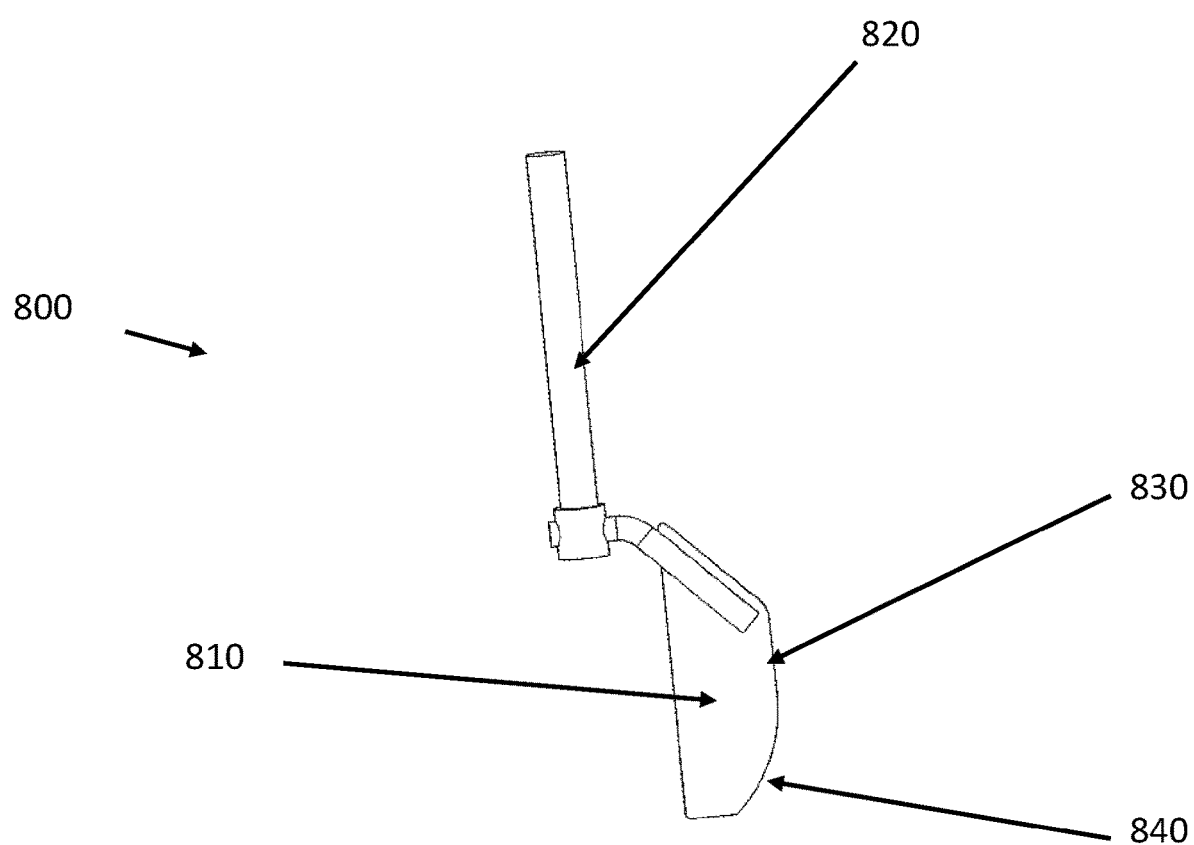
FIG. 9 is an isometric view of a scraper, according to an embodiment.

FIG. 9 illustrates a scraper assembly 800, according to an embodiment. Scrapper assembly 800 may comprise a vertical shaft 820 allowing travel between retracted and bottom scraping positions within the bowl as well as rotation to disengage the scraper from the bowl wall, blade 810 with different edge contours to better engage different and/or particular sections of the bowl, for example by fitting the scraper to the profile of the bowl. For example, straight section 830 would be most effective along a straight vertical section of the bowl while curved section 840 would be most effective at scraping the bottom corner sections of the bowl clean.

Figure 10:
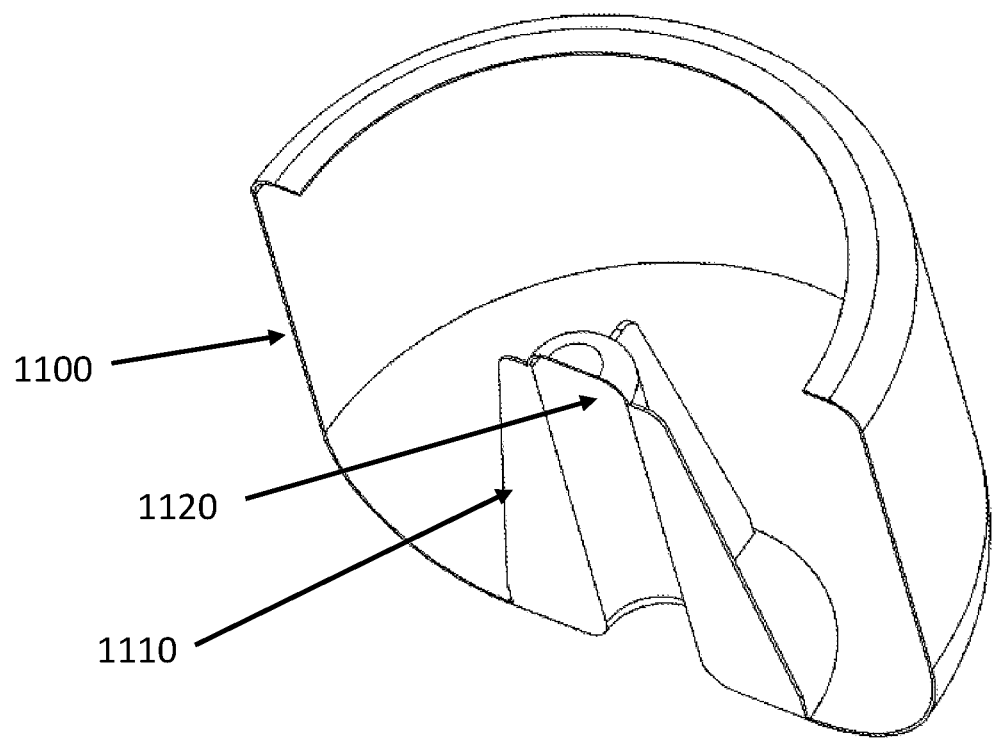
FIG. 10 is a section view of a centrifuge bowl, according to an embodiment.

FIG. 10 illustrates a centrifuge bowl 1100, according to an embodiment. Centrifuge bowl 1100 incorporates a set of vanes 1110 attached to the inner torus wall 1120. Vanes 1110 can be used to help agitate the dispersed coffee grounds in the extraction fluid to enhance diffusion of dissolvable solids from the grounds and promote a more homogeneous mixture prior to centrifugal separation. The centrifuge bowl may include other elements, either attached to the interior or otherwise placed in the bowl to facilitate agitation of the contents. The interior surface of the centrifuge bowl 1100 may include temperature sensors and control elements as discussed elsewhere in the present disclosure. For example, cooling or heating structures such as tubes or fins may be placed at any point in the interior of the centrifuge bowl 1100, or along any of the piping between centrifuges. As discussed above, the centrifuge bowl 1100 may include perforations for filtering.

In some embodiments, the centrifuge bowl may be spun to a desired RPM to separate the liquids and solids in the bowl. The solids may be captured around the inside surface of the bowl while the liquids are removed through an exit port in the centrifuge or using a skimmer tube as described more fully below. The RPM may be limited to allow some small fraction of liquid to remain in the grinds to facilitate subsequent remixing of the grinds in a next stage. The liquid may be captured in a secondary tank until space is available at the next "station" or stage in the battery. The liquid may be heated, re-heated, or chilled before entering the next centrifuge stage. In some embodiments, the liquid is guided into a funnel and then into a piping system which includes a heat exchanger for use to heat or cool the extract before a next stage. During transit and any temporary storage, the liquid is, optionally, protected from oxidation by keeping it blanked in an inert gas or nitrogen. Similarly, the grinds remaining in the bowl are, optionally, protected from oxidation and evaporation.

In some embodiments, the liquid is extracted from the bowl using a skimmer tube, i.e., a tube which is inserted into the liquid portion and used to remove liquid from the bowl using a vacuum, differential pressure, or even the dynamic pressure of the liquid as it impacts the skimmer tube opening. In some embodiments, the liquid level in the bowl is augmented by the addition of more extract from a previous station or more fresh water. The temperatures, concentrations, and amounts of the added liquid may vary strategically from the initial liquid to control extraction and concentration of extractables.

This mixing and separation sequence takes place in each of the centrifuges in the battery, according to an embodiment. The centrifuges are otherwise treated like the columns in a column battery in that their relative position in the flow (first in the flow, nearest the introduction of fresh water or solvent, to last in the flow nearest where fresh solids are added) continually changes following completion of each stage iteration (which may occur, for example, when one bowl is removed from the rotation and/or replaced with another). At one point in the sequence, fresh grounds and a nearly-completed extract are mixed in the bowl. During intermediate stages, progressively less concentrated extract is added to partially extracted grinds. At the opposite end of the process from the addition of fresh grinds being added, fresh water is added to almost fully extracted grinds. Optionally, when the grounds in a centrifuge are fully depleted, that centrifuge is "taken offline," the grounds are discarded, the bowl is cleaned and refilled with fresh grinds, and it re-enters the flow figuratively at the other end of the battery. In short, this is a staged counter-current flow process that operates in a quasi-steady-state manner over time. As old grounds (and optionally bowls therewith) are removed from the rotation, new grounds are introduced, and grounds from the previous stage take the place of the next stage along the path. The extract temperature and ratio of the extract to new or used grounds may be calculated, sensed, and adjusted to achieve certain extraction rates and flavor profiles.

At each intermediate stage or a subset of intermediate stages, following separation of liquid and solid, the solids may be scraped off the inside wall of the bowl and allowed to fall back to the center/bottom of the bowl where they can be mixed with newly introduced water of unfinished extract. In some embodiments, the methods for scraping the inside of the centrifuge include introducing a scraper into the bowl. Alternatively, a scraper may be kept in the bowl already to avoid the introduction of oxygen that may otherwise occur when a scraper is introduced. The scraper within the bowl may be on the center radial axis of the bowl and spin with or against the bowl. Alternatively, the scraper may spin when the centrifuge is idle, or the scraper may stay idle and the bowl may spin. The scraper may include a mechanical function to retract and extent from its radial center. In some embodiments, the scraper is manually controlled using a lever on the outside of the centrifuge. In some embodiments, the scraper is actuated under the control of a programmable logic controller (PLC) or other controller and pneumatic actuation or stepper or servo motor actuation.

In some embodiments, the scraping is done using an impinging gas or liquid to reposition the grounds into the middle of the bowl. In some embodiments, an extract is redistributed into the bowl at the outside diameter to push the grounds into the center of the bowl.

Once a centrifuge has reached the stage where its grinds have been extracted multiple times and after they have finally been mixed with fresh water, the bowl of the centrifuge is either removed and replaced with a clean bowl or the grinds are removed while the bowl remains in place. Either way, the centrifuge is made ready for a new charge of fresh grinds and resumes its travel through the complete cycle.

At each intermediate stage, following separation of liquid and solid, the liquid typically is removed from the centrifuge and transferred to the next centrifuge in the battery where it is mixed with the grinds that have been scraped from the sides of the bowl or, at the final step, grinds that have been freshly added to the system. Following mixing with the fresh grinds and centrifugal removal from the bowl, this extract is removed from the system and sent to downstream processing in preparation for packaging. Ideally, no intermediate tank is needed between stages to temporarily hold the liquid. This can be accomplished by systematically emptying the centrifuges in order from the final extract removal stage backward. For example, the centrifuge with the freshest grinds is emptied of its liquid which are sent to the downstream for collection, homogenization (of TDS levels), and packaging. This process leaves its bowl empty to receive liquid extract from the previous centrifuge, which can then be emptied. Making the transfer in this way may mean that no secondary pumps are required and opportunities for the extract to cool or be exposed to oxidation or aroma loss are minimized. In some embodiments, however, liquid is extracted from one bowl using the suction of a pump and positively transferred to the next bowl in the sequence. In some embodiments, this pump suction is connected to the skimmer tube of the bowl being emptied. In some embodiments, the bowl is enclosed to better support a modified atmospheric packaging (MAP) (e.g., nitrogen) environment.

Automatic bowl cleaning is well known in the industry. Some modification may be required to the cleaning arm/edge, however, to retain the grounds and redirect them back into the bowl center. A compliant scraper replicating the bowl cross section incorporating a water flush system may be used to remove solids back to the center of the bowl for cleaning. In some embodiments, the bowl may be agitated to help move grounds. Agitation may take a variety of forms, such as, but not limited to the fins shown in FIG. 10 and/or the scraper shown in FIG. 9. According to other embodiments, the agitation may be provided by rinsing the sidewalls with a liquid, impinging a gas against the sidewall, or otherwise imparting motion on the bowl (e.g., vibration) to cause the grounds to travel downward from the side walls of the bowl.

A removable bowl may facilitate the thorough cleaning of the bowl following the final stage in the process and minimize downtime before this centrifuge can be loaded with fresh grinds. It also allows for repair of any wear or damage that may occur to the bowl, again, improving up-time for the overall system.

According to an embodiment, a multi-stage counter-flow system may be optimized for liquid/solid extraction and separation and may also include the capabilities for preliminary mixing of a dispersed small-particle slurry for a controlled time period before centrifugal separation begins.

The bowls in some embodiments are lined with internal channels that are connected through a rotating seal joint to a glycol refrigeration system. This system is used to expedite chilling the product while still being separated in the final bowl.

In some embodiments, the complete extract product is chilled rapidly in an oxygen free environment. In further embodiments, the extract may be frozen within a pod, or frozen and then place within a pod.

The description above addressed the reasons for employing small particles in an extraction system and the use of a series of centrifuges to create a staged counter-current process. This following description discloses one embodiment for creating the small particles in a way that maximizes capture of flavor and aroma.

In the envisioned staged counter-current system described above, with coffee as an example of an extractible solid, fresh water is introduced at one end of a battery of centrifuges and fresh coffee grounds are introduced at the other end. In traditional column battery systems used for coffee, for example, these fresh grounds are created by using a coffee grinder or granulator and they are introduced dry into a column or a pre-wetting stage.

Particle sizes created by this equipment range as shown in Table 1, which was obtained from Lingle, T. Brewing Handbook, SCAA. Table 1 shows particle size as a function of the number of particles per unit weight. The columns in order include the description of the sample, the size in millimeters, the number of particles, the increase in parts per gm for each type of grind, the ratio increase at each stage, and the area in sq/gm. Note that even at the Espresso Grind level, the diameter of the particles is approximately 0.20 mm or 200 microns. As envisioned in this small particle approach, particle size targets are in the range of 0.02-0.05 mm (20-50 microns), i.e., about an order of magnitude smaller than an Espresso Grind.

According to some embodiments of the grounds, 99% of particles (by number) may have a diameter of greater than about 4 microns while less than 100 microns, less than 70 microns, less than 50 microns, less than 45 microns, less than 40 microns, less than 35 microns, less than 30 microns, less than 25 microns, and/or less than 20 microns. According to some embodiments of the grounds, 99% of particles (by number) may have a diameter between 20-25 microns, between 20-30 microns, between 20-40 microns, between 20-50 microns, between 20-70 microns, and/or between 20-100 microns. According to some embodiments of the grounds, the mean particle diameter may be between 18-20 microns, between 15-25 microns, between 15-30 microns, between 15-40 microns, between 15-50 microns, between 15-70 microns, between 15-100 microns, 20-25 microns, between 20-30 microns, between 20-40 microns, between 20-50 microns, between 20-70 microns, and/or between 20-100 microns. According to some embodiments of the grounds, the mean particle diameter may be greater than 4 microns while less than 20 microns, less than 25 microns, less than 30 microns, less than 35 microns, less than 40 microns, less than 50 microns, less than 70 microns, and/or less than 100 microns. According to some of the embodiments, the particles may be of the size distributions defined in this paragraph and may have a standard deviation of less than 50 microns, less than 40 microns, less than 30 microns, less than 25 microns, less than 20 microns, less than 15 microns, less than 10 microns, and/or less than 5 microns.

Figure 3:
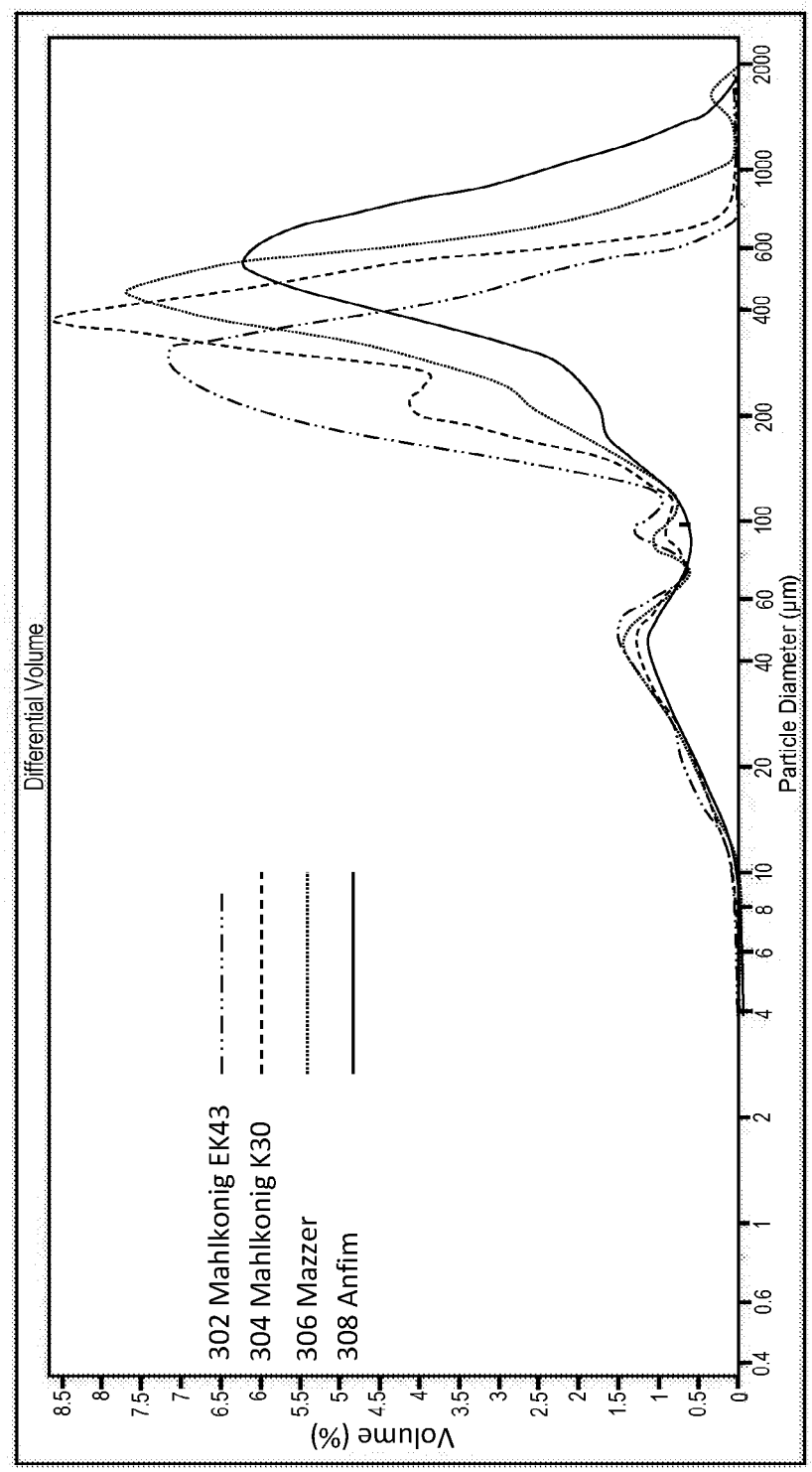
FIG. 3 is a graph presenting particle distribution curves for four different coffee grinders, according to some embodiments.

As noted in FIG. 3, which was obtained from: https://baristahustle.com/blogs/barista-hustle/the-grinder-paper-explained, ground coffee typically demonstrates a somewhat bimodal profile. FIG. 3 is similar to FIG. 2A, and shows four particle diameter distributions based on volume percent. In particular, the percentage of the total volume of the grinds is shown on the vertical axis as a function of particle diameter on the horizontal axis. Each of the four distributions 320, 322, 324, and 326 represent sample data from four different grinders. In particular, distributions 320, 322, 324, and 326 are associated with grinds from the Mahlkonig® EK43, Mahlkonig® K30, Mazzer®, and Anfim® grinders, respectively, all of which are commercially available.

Figure 4:
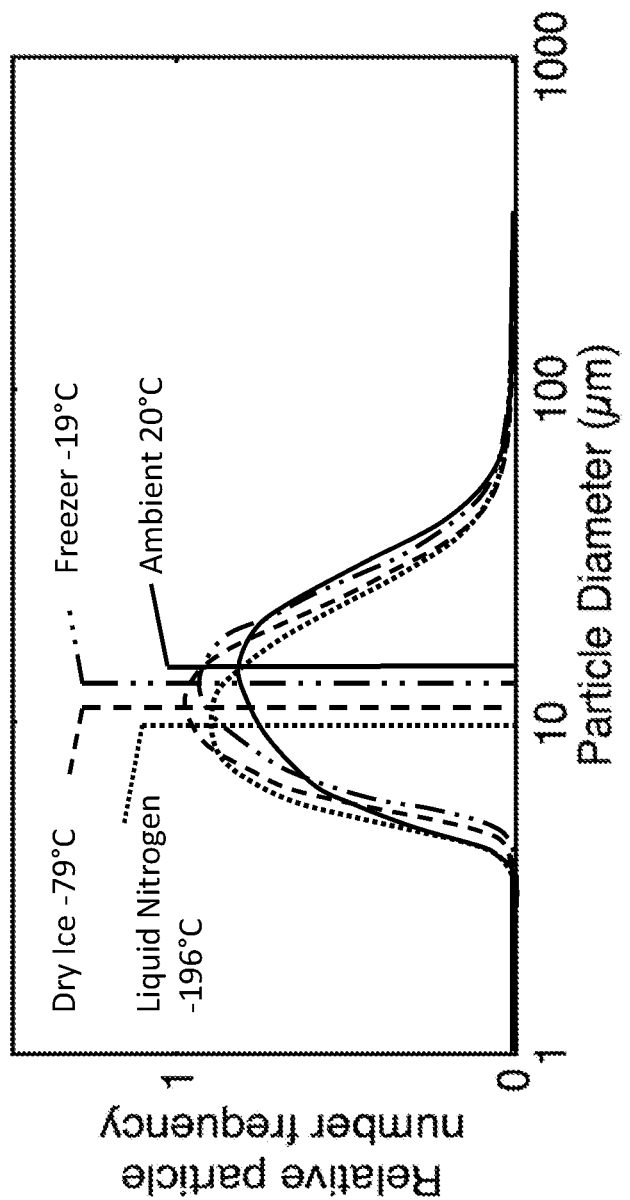
FIG. 4 is a graph presenting particle distribution curves for a single grinder wherein the coffee beans were conditioned to different temperatures prior to grinding, according to some embodiments.

The peaks shown on the right for each distribution are representative of the settings and/or characteristics of each respective grinder. The peaks around 20-40 microns are representative of a "natural" fracture particle size inherent in most coffee particles. This is, for example, the mean diameter of particles that flake off along the fracture edges of the larger ground particles. FIG. 4, shows how small particles are distributed as a function of fracture temperature, with particle diameter shown on the horizontal axis and relative particle number frequency shown on the vertical axis (normalized to 1). As shown in FIG. 4, which was obtained from https://www.nature.com/articles/srep24483, each particle was ground at different temperatures, for example 20, −19, −79, and −196 degrees Celsius. The distributions vary, with diameter distribution centers decreasing as the temperature of the beans decreases.

The graph in FIG. 3 shows small particles that range in size from about 5 microns to about 50 microns, with the majority in the range of about 8-40 microns. This lower end represents a size that coffee seems to naturally migrate to when repeatedly fractured. This suggests a process that takes either whole bean coffee or normally ground coffee and then further submits it to fracturing stresses to drive almost all the particles down to a very narrow size distribution and one that will respond almost instantaneously to liquid extraction dispersion efforts, yielding the near uniform extraction levels shown at the beginning of this document.

One such fracturing process already well known in the art is ball mill grinding. This is a process that uses balls, preferably made from a very hard, dense material such as stainless steel, ceramic, zirconium, etc. and a rotary drum to pulverize some medium. While it is relatively unknown in coffee grinding or extraction, it is widely practiced in heavy industrial settings such as cement production. Another related method is wet ball mill grinding, wherein a fluid is added to the ball mill to lubricate the process and create a slurry instead of a lot of dry dust. Another process similar, but more energetic, is bead milling in which the balls are propelled against the side of the container (and the material being ground) by a series of disks. Because of the heat generated from this process, bead milling is typically performed wet. In some embodiments, fine grinding of coffee particles can be achieved with a special disc mill wherein the discs have been designed to yield grounds suitable for Turkish coffee or even smaller particles. In some embodiments, a series of granulating rollers creates the fine particles, the rollers preferably water or glycol chilled, to minimize aroma loss. In some embodiments, the beans are first cryogenically chilled or frozen to both make them easier to micro-grind and to reduce volatile flavor and aroma loss and then kept cold during the grinding process to continue to minimize volatile flavor and aroma loss.

Given the centrifugal staged counter-flow extraction process previously described and referring to FIG. 5, a ball mill grinder 530 may be introduced at the end of the line where fresh coffee grounds 532 are added to the system between centrifuges 504 and 505. In one embodiment, the liquid extract from the next-to-last centrifuge in the battery is removed from the slurry (e.g., using a skimmer tube) and directed into a ball mill where it wets fresh grinds created, for example, in the range of 5-50 microns, and is used through the pulverizing stage. In such a system, which could be operated with the system at either a cold or hot temperature (30-195° F.), the liquid would both act to create a slurry of the previously dry coffee particles and begin the extraction of dissolvable solids. If speed of extraction was of primary value, the process is operated toward the hotter end of the range provided. If, on the other hand, the goal is to capture as much of the flavor and aroma compounds (without over-extraction) of the small particle coffee grinds, the process is operated toward the colder end of the range provided. The milling process can be operated wherein the balls impact the coffee medium under normal gravitational acceleration or, with some additional rotary motion of the mill, at higher g-loads. The duration of the ball milling process can be determined either by the degree of extraction desired or by the final particle size target.

At the end of the ball milling process, the freshly ground slurry is ejected to the final centrifuge in the line and the fine particles separated from the free liquid. The free liquid then exits the system to be chilled and packaged for delivery to consumers while the fine particles are scraped off the bowl wall and made ready for weaker extract to be introduced in a subsequent stage of the multi-stage process.

Since the dry coffee grounds introduced into the ball mill will absorb some amount of water, this bound water (i.e., water that will remain with the grounds) must be added at the beginning of the cycle with the other amount of fresh water added. Thus, throughout all the centrifuges leading up to the ball mill grinder, there is excess water—a factor that tends to decrease the intermediate TDS values, but increase the local extraction yield.

Also, throughout the grinding process, as with the centrifuge processes, the atmosphere over the slurry is, in some embodiments, nitrogen, or an inert gas to prevent oxidation of the very fine particles.

In some embodiments, the packaging includes flash freezing to capture peak flavor and freshness. In some embodiments, the process of chilling the extract begins either in the ball mill grinder or in the final centrifuge bowl. In some embodiments, the final liquid extract moving to packaging passes through a heat exchanger to refrigerate the extract to 30-35° F.

In some embodiments, the water added at the beginning of the cycle is 195° F.+/−5° F. and is kept at this temperature throughout the cycle. In some embodiments, the water added at the beginning of the cycle is 195° F.+/−5° F., but it is allowed to slowly cool, either naturally or in a programmed way, throughout the cycle. In some embodiments, the water added at the beginning of the cycle is cooler than 195° F., potentially as cool as room temperature or even cooler to reduce the rate of extraction in the very fine particles and extend the time per stage to a more manageable period and is kept at this lower temperature throughout the cycle.

Also consider another example process during which the fresh coffee beans are ground using a special disc mill or granulator to obtain particle sizes of 5-50 microns. In some embodiments, this disc milling, or granulating is done dry with the grounds immediately being combined with water at a desired temperature, to capture as much of the volatile flavor and aroma compounds as possible. In some embodiments, this water capture occurs when the grinds fall by gravity into a pool or running stream of liquid. In some embodiments, this liquid capture occurs in the form of a fine spray which impacts the coffee grinds immediately after their exit from the grinder. In some embodiments, the captured grinds and liquid slurry are kept in a temporary holding tank for a desired amount of time, with or without agitation and with or without additional heating or cooling, prior to being introduced into the final centrifugal stage for separation. In some embodiments, the spray or pool or running liquid is an extract from a previous stage. In other embodiments, the spray or pool or running liquid is fresh water (or the appropriate solvent).

In some embodiments the coffee grinds are obtained through multiple grinding stages, using multiple grinder architecture (i.e. conical, burr, ball mill) in some form of series. The methods to obtain sufficiently small particulates may manifest as a combination of dry and wet grinding. In other embodiments the grinder may be designed to feature a hammering/crushing mechanism before rotating burrs destroy the resultant grounds.

The many embodiments described herein disclose the use of a centrifuge bowl for conducting the extraction of desirable coffee compounds from ground coffee as well as separating the resultant extract liquid from the coffee grounds. However, any and all extraction steps described herein can be conducted in a different vessel than the centrifuge bowl. In such embodiments, one or more of the centrifuge(s) are used only for separating the extract liquid from the coffee grounds—the extracted coffee grounds and resultant extract liquid being transferred from the extraction vessel into the centrifuge after extraction has occurred.

Aspects of the techniques and systems related to producing a food or a beverage extract in an automated fashion as disclosed herein may be implemented as a computer program product for use with a computer system or computerized electronic device. Such implementations may include a series of computer instructions, or logic, fixed either on a tangible/non-transitory medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein.

What is claimed is:

1. A method comprising:
countercurrently passing an aqueous medium through first and second serially connected centrifuges containing roast, ground coffee to produce coffee extract by drawing-off a first extract from the first centrifuge and passing the first extract to the second centrifuge;
drawing-off a portion of a second extract from the second centrifuge;
stopping the flow of the aqueous medium through the first centrifuge;
serially connecting a third centrifuge containing roast, ground coffee to the second centrifuge and countercurrently passing the aqueous medium through the second and third centrifuges to produce coffee extract by drawing-off a third extract from the second centrifuge and passing the third extract to the third centrifuge; and
drawing-off a portion of a fourth extract from the third centrifuge.

2. The method of claim 1, wherein the first centrifuge, the second centrifuge, and third centrifuge are different centrifuges.

3. The method of claim 1, wherein the first centrifuge and the third centrifuge are the same centrifuge, the serially connecting the third centrifuge to the second centrifuge includes coupling an outlet of the second centrifuge to an inlet of the third centrifuge, and the roast, ground coffee contained in the third centrifuge has not been extracted.

4. The method of claim 1, further comprising supplying the roast, ground coffee contained in at least one of the first centrifuge or second centrifuge, the roast ground coffee comprising particles having a mean diameter of less than 100 microns.

5. The method of claim 4, further comprising forming the roast, ground coffee having a mean diameter of less than 100 microns by grinding coffee in at least one of a ball mill, a disc mill, or a bead mill.

6. The method of claim 5, wherein the grinding of the coffee is wet grinding.

7. The method of claim 1, further comprising:
dispersing the roast, ground coffee contained in at least one of the first centrifuge or second centrifuge in the aqueous medium; and
agitating the roast, ground coffee contained in at least one of the first centrifuge or second centrifuge and the aqueous medium to promote diffusion of dissolvable coffee solids into the aqueous medium.

8. The method of claim 1, wherein the drawing-off of at least one of the first, the second, the third, or the fourth extract occurs during separation of the aqueous medium liquid and the roast, ground coffee.

9. The method of claim 8, further comprising spinning at least one of the first, the second, or the third centrifuges to separate the aqueous medium and the roast, ground coffee.

10. The method of claim 1, wherein the drawing-off of at least one of the first, the second, the third, or the fourth extract comprises the use of a skimmer tube through which extract flows due to dynamic pressure imparted by spinning of the aqueous medium and the roast, ground coffee.

11. The method of claim 1, wherein the drawing-off of at least one of the first, the second, the third, or the fourth extract comprises the use of a skimmer tube in fluid communication with a pump to draw extract through the skimmer tube.

12. The method of claim 1, wherein the drawing-off of at least one of the first, the second, the third, or the fourth extract comprises:
propelling extract over an open edge of a centrifuge bowl;
collecting extract within a casing of the centrifuge; and
draining extract through an outlet in the centrifuge casing.

13. The method of claim 1, further comprising scraping extracted roast, ground coffee from a sidewall of a bowl of the second centrifuge after drawing-off the portion of the second extract and before countercurrently passing the aqueous medium through the second and third centrifuges.

14. The method of claim 1, further comprising heating at least one of the aqueous medium or the roast, ground coffee.

15. The method of claim 1, further comprising cooling at least one of the aqueous medium or the roast, ground coffee.

16. The method of claim 1, further comprising providing an inert atmosphere in an interior of a bowl of at least one of the first, the second, or the third centrifuge.

17. The method of claim 1, further comprising:
removing a first bowl of the first centrifuge after stopping the flow of aqueous medium through the first centrifuge; and
removing the roast, ground coffee contained in the first bowl of the first centrifuge.

18. The method of claim 17, further comprising:
installing a second bowl in the first centrifuge;
providing unextracted roast, ground coffee to the second bowl; and
providing the first centrifuge with the second bowl as the third centrifuge containing roast, ground coffee.

19. A system comprising;
a liquid supply;
a first centrifuge having:
a first bowl having sides,
a first inlet,
a first supernatant outlet, and
a first movable bowl scraper configured to selectively reposition material adjacent to the sides of the first bowl away from the sides of the first bowl;
a second centrifuge having:
a second bowl,
a second inlet,
a second supernatant outlet, and
a second movable bowl scraper configured to selectively reposition material adjacent to the sides of the second bowl away from the sides of the second bowl;
a grinder configured to supply particulate material to at least one of the first or the second centrifuge; and
a reconfigurable piping system countercurrently coupling the liquid supply and the first or the second centrifuges, the reconfigurable piping system having a plurality of configurations:
wherein in a first configuration, the piping system supplies liquid from the liquid supply to the first inlet,
wherein in a second configuration, the piping system supplies liquid from the liquid supply to the second inlet,
wherein in a third configuration, the piping system supplies liquid from the first supernatant outlet to the second inlet, and
wherein in a fourth configuration, the piping system supplies liquid from the second supernatant outlet to the first inlet.

20. The system of claim 19, further comprising a third centrifuge having:
a third bowl;
a third inlet;
a third supernatant outlet; and a third movable bowl scraper configured to selectively reposition material adjacent to the sides of the third bowl away from the sides of the third bowl;

wherein the grinder is further configured to supply particulate material to at least one of the first, the second, or the third centrifuge;

wherein in a fifth configuration, the piping system supplies liquid from the liquid supply to the third inlet, and wherein in a sixth configuration, the piping system supplies liquid from the third supernatant outlet to the first inlet.

21. The system of claim 19, further comprising a heat exchanger, wherein the reconfigurable piping system is configured to selectively couple the heat exchanger to at least one of the first or the second supernatant outlet.

22. The system of claim 19, at least one of the first or the second centrifuges further comprising an inert gas supply inlet.

23. The system of claim 19, the reconfigurable piping system including an in-line refractometer.

24. The system of claim 19, at least one of the first or the second centrifuges further comprising a skimmer tube.

25. The system of claim 24, further comprising a pump in fluid communication with the skimmer tube.

26. The system of claim 19, further comprising a pump in fluid communication with an interior of at least one of the first bowl or the second bowl.

27. The system of claim 19, at least one of the first or the second bowls including a perforated sidewall.

* * * * *